United States Patent
Abdalla et al.

(10) Patent No.: US 11,444,376 B2
(45) Date of Patent: Sep. 13, 2022

(54) SYSTEMS AND METHODS FOR CALIBRATING ARRAYS OF DUAL-POLARIZATION ANTENNA ELEMENTS

(71) Applicant: Analog Devices International Unlimited Company, Limerick (IE)

(72) Inventors: Mohamed Ahmed Youssef Abdalla, Cairo (EG); Islam Eshrah, Giza (EG); Ahmed Ibrahim, Dracut, MA (US); Ahmed Mehana, Cairo (EG)

(73) Assignee: ANALOG DEVICES INTERNATIONAL UNLIMITED COMPANY, Limerick (IE)

(*) Notice: Subject to any disclaimer, the term of this patent is extended or adjusted under 35 U.S.C. 154(b) by 42 days.

(21) Appl. No.: 16/894,048

(22) Filed: Jun. 5, 2020

(65) Prior Publication Data
US 2021/0384624 A1 Dec. 9, 2021

(51) Int. Cl.
*H01Q 3/26* (2006.01)
*H04B 17/11* (2015.01)
(Continued)

(52) U.S. Cl.
CPC ........... *H01Q 3/267* (2013.01); *H01Q 21/061* (2013.01); *H01Q 21/08* (2013.01); *H04B 17/11* (2015.01)

(58) Field of Classification Search
CPC .... H01Q 3/267; H01Q 21/0025; H01Q 1/247; H01Q 3/38; H01Q 21/22; H01Q 3/28;
(Continued)

(56) References Cited

U.S. PATENT DOCUMENTS 5,864,317 A * 1/1999 Boe .................. H01Q 3/267
342/368
7,068,218 B2 6/2006 Göttl et al.
(Continued)

FOREIGN PATENT DOCUMENTS

EP 2173005 4/2010
EP 2173005 A1 * 4/2010 ............. H01Q 1/246
(Continued)

OTHER PUBLICATIONS

*Advanced Antenna Systems for 5G*, 5G Americans White Paper, Aug. 2019, 59 pages.
(Continued)

*Primary Examiner* — Andrea Lindgren Baltzell
*Assistant Examiner* — Yonchan J Kim
(74) *Attorney, Agent, or Firm* — Akona IP

(57) ABSTRACT

Systems and methods for performing calibration of antenna arrays with dual-polarization antenna elements are disclosed. An example system includes an antenna array and a calibration circuitry. The antenna array includes a plurality of antenna cells arranged in K rows and L columns, each cell including a plurality of dual-polarization antenna elements. Antenna cells in columns 1 through Y form a first sub-array, while antenna cells in columns Y+1 through L form a second sub-array. The calibration circuitry is configured to perform calibration by individually calibrating each column of antenna cells of the first sub-array, calibrating different columns of antenna cells of the first sub-array with respect to one another, individually calibrating each column of antenna cells of the second sub-array, calibrating different columns of antenna cells of the second sub-array with respect to one another, and calibrating antenna elements of the first and second sub-arrays with respect to one another.

20 Claims, 26 Drawing Sheets

(51) Int. Cl.
*H01Q 21/08* (2006.01)
*H01Q 21/06* (2006.01)

(58) Field of Classification Search
CPC ...... H01Q 3/30; H01Q 21/061; H01Q 21/296; H01Q 21/08; H04B 17/21; H04B 17/12; H04B 17/19; H04B 17/14; H04B 17/11
See application file for complete search history.

(56) References Cited

U.S. PATENT DOCUMENTS

| | | | |
|---|---|---|---|
| 8,199,048 B1 | 6/2012 | Medina Sanchez | |
| 9,929,782 B2 | 3/2018 | André et al. | |
| 10,573,974 B2 | 2/2020 | Rowell et al. | |
| 10,931,362 B1* | 2/2021 | Bruzzone | H04B 17/345 |
| 2009/0267824 A1* | 10/2009 | Cooper | H01Q 3/267 |
| | | | 342/174 |
| 2011/0001660 A1* | 1/2011 | Ray | H01Q 3/267 |
| | | | 342/174 |
| 2013/0171946 A1 | 7/2013 | Veihl et al. | |
| 2019/0267707 A1 | 8/2019 | Khalil et al. | |
| 2020/0411981 A1* | 12/2020 | Kimball | H04B 1/44 |

FOREIGN PATENT DOCUMENTS

| | | |
|---|---|---|
| WO | 1999/54960 | 10/1999 |
| WO | 2013/123913 | 8/2013 |

OTHER PUBLICATIONS

Pang et al., *Dual-Polarized Planar Phased Array Analysis for Meteorological Applications*, Hindawi Publishing Corporation, International Journal of Antennas and Propagation, vol. 2015, Article ID 340704, 13 pages.

Nafe et al., *An In-Situ Self-Test and Self-Calibration Technique Utilizing Antenna Mutual Coupling for 5G Multi-Beam TRX Phased Arrays*, 978-1-7281-1309-8/19 © 2019 IEEE, 4 pages.

Antenna Polarization Basics, http://mimosa.co/white-papers/antenna-polarization-2, Mimosa Networks, Inc. 2018, 9 pages.

Extended European Search Report issued in EP21177242.1 dated Oct. 28, 2021, 14 pages.

\* cited by examiner

SYSTEMS AND METHODS FOR CALIBRATING ARRAYS OF DUAL-POLARIZATION ANTENNA ELEMENTS

TECHNICAL FIELD OF THE DISCLOSURE

The present disclosure generally relates to radio frequency (RF) systems and, more particularly, to calibration of phased antenna array systems with dual-polarization antenna elements.

BACKGROUND

Radio systems are systems that transmit and receive signals in the form of electromagnetic waves in the RF range of approximately 3 kiloHertz (kHz) to 300 gigaHertz (GHz). Radio systems are commonly used for wireless communications, with cellular/wireless mobile technology being a prominent example.

In context of radio systems, an antenna is a device that serves as the interface between radio waves propagating wirelessly through space and electric currents moving in metal conductors used with a transmitter or receiver. During transmission, a radio transmitter supplies an electric current to the antenna's terminals, and the antenna radiates the energy from the current as radio waves. During reception, an antenna intercepts some of the power of a radio wave in order to produce an electric current at its terminals, which current is subsequently applied to a receiver to be amplified. Antennas are essential components of all radio equipment, and are used in radio broadcasting, broadcast television, two-way radio, communications receivers, radar, cell phones, satellite communications and other devices.

An antenna with a single antenna element will typically broadcast a radiation pattern that radiates equally in all directions in a spherical wavefront. Phased antenna arrays generally refer to a collection of antenna elements that are used to focus electromagnetic energy in a particular direction, thereby creating a main beam. Phased antenna arrays offer numerous advantages over single antenna systems, such as high gain, ability to perform directional steering, and simultaneous communication. Therefore, phased antenna arrays are being used more frequently in a myriad of different applications, such as in military applications, mobile technology, on airplane radar technology, automotive radars, cellular telephone and data, and Wi-Fi technology.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIGS. 5A-5I provide schematic illustrations of different states of performing step 1 of the calibration method of FIG. 4 for the antenna apparatus of FIG. 2, according to some embodiments of the present disclosure;

DESCRIPTION OF EXAMPLE EMBODIMENTS OF THE DISCLOSURE

Overview

Figure 1:
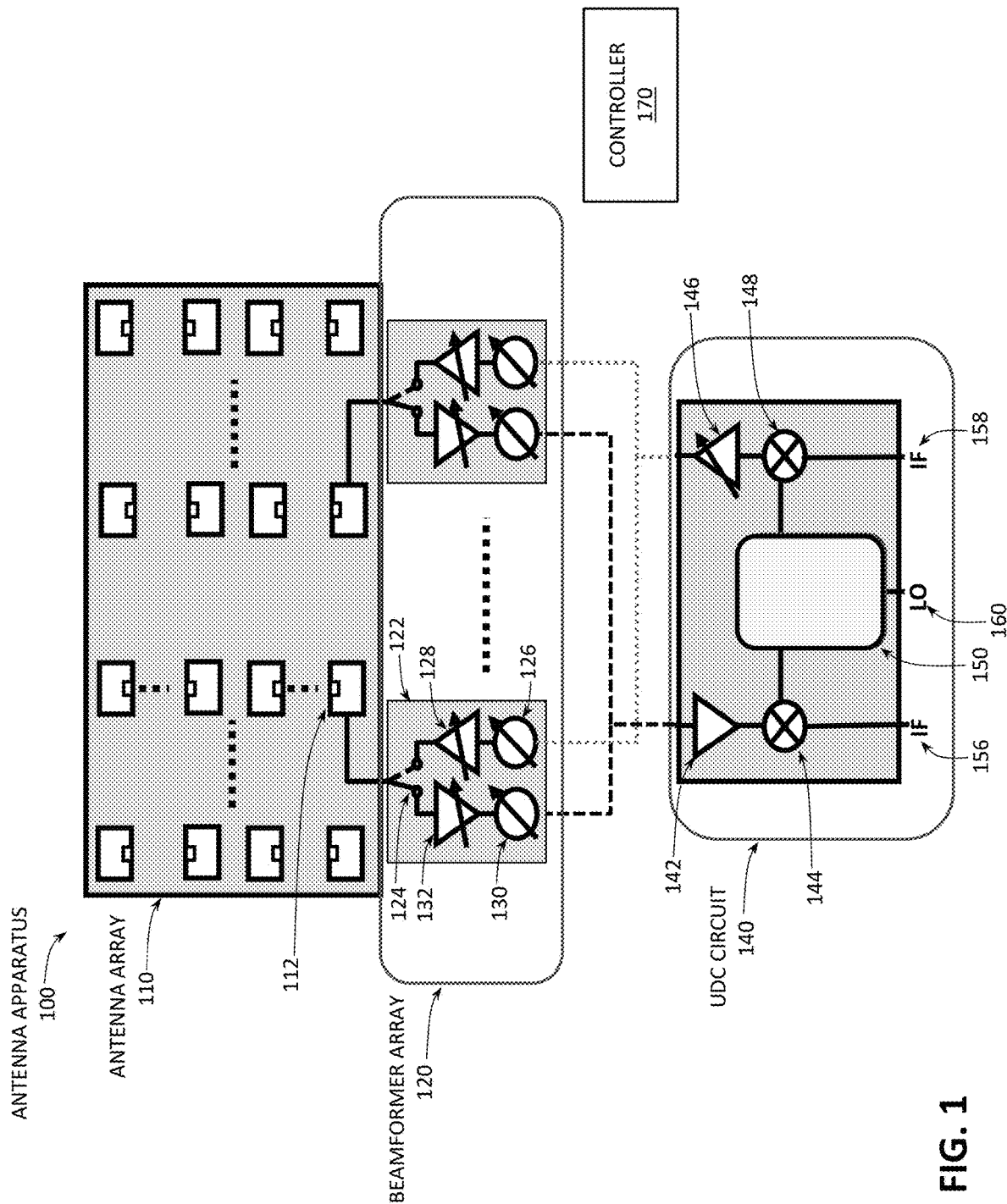
FIG. 1 provides a schematic illustration of an example antenna apparatus, according to some embodiments of the present disclosure.

The systems, methods and devices of this disclosure each have several innovative aspects, no single one of which is solely responsible for all of the desirable attributes disclosed herein. Details of one or more implementations of the subject matter described in this specification are set forth in the description below and the accompanying drawings.

For purposes of illustrating calibration of antenna arrays with dual-polarization antenna elements in phased array systems, proposed herein, it might be useful to first understand phenomena that may come into play in such systems. The following foundational information may be viewed as a basis from which the present disclosure may be properly explained. Such information is offered for purposes of explanation only and, accordingly, should not be construed in any way to limit the broad scope of the present disclosure and its potential applications.

As described above, phased antenna arrays generally refer to a collection of antenna elements that are used to focus RF energy in a particular direction, thereby creating a main beam. In particular, the individual antenna elements of a phased antenna array may radiate in a spherical pattern, but, collectively, a plurality of such antenna elements may be configured to generate a wavefront in a particular direction through constructive and destructive interference. The relative phases of the signal transmitted at each antenna element can be either fixed or adjusted, allowing the antenna system to steer the wavefront in different directions. A phased antenna array typically includes an oscillator, a plurality of antenna elements, a phase adjuster or shifter, a variable gain amplifier, a receiver, and a control processor. A phased antenna array system uses phase adjusters or shifters to control the phase of the signal transmitted by an antenna element. The radiated patterns of the antenna elements constructively interfere in a target direction creating a wavefront in that direction called the main beam. The phased array can realize increased gain and improve signal to interference plus noise ratio in the direction of the main beam. The radiation pattern destructively interferes in several other directions other than the direction of the main beam, and can reduce gain in those directions.

The amplitude of the signals emanating from the antenna elements affects the side lobe levels, where the side lobes are lobes of the radiation pattern that are not in the direction of the main lobe. It is generally preferable to reduce side lobe levels such that the antenna system can focus the readings from the radiation pattern to a target direction. As such, the precision of the relative phase and amplitude between the elements determines the precision of the beam direction and the side lobe levels, respectively.

As the foregoing illustrates, the accuracy of the control in phase shift and amplitude (or gain) for the collection of antenna elements is important to the implementation of the phased array. In order to obtain the full benefit of a phased antenna array system, calibration may be performed to account and compensate for phase and amplitude/gain variations or mismatches which may be caused by one or more of fabrication processes used to fabricate the system, voltage variations, and temperature variations during operation of the system. Conventionally, calibration has been performed at the factories designated for that purpose. Unfortunately, not only is the factory calibration expensive, but it is not always possible or sufficient, and calibration in the field may be needed.

Performing calibration of a phased antenna array in the field (i.e., outside of a factory setting) is not trivial and a variety of factors can affect the cost, quality and robustness of a calibration arrangement. The challenges are exacerbated even further as the number of RF network modules which need to be calibrated in order to be phase- and amplitude-synchronized increases. Physical limitations such as space/surface area, as well as regulations can pose further constraints to the calibration systems and methods, and thus trade-off and ingenuity will have to be exercised. Furthermore, dual-polarization antenna elements (i.e., antenna elements that can transmit and receive both horizontally and vertically polarized radio waves) present further challenges for performing calibration.

Various embodiments of the present disclosure provide systems and methods for performing calibration of antenna arrays with dual-polarization antenna elements, e.g., of phased antenna arrays of fifth generation cellular (5G) or millimeter-wave (mm-wave) technology. An example system is an antenna apparatus that includes an antenna array and a calibration circuitry. The antenna array includes a plurality of antenna cells arranged in K rows and L columns, where K and L are suitable integers (e.g., K may be an integer equal to or greater than 3, while L may be an integer equal to or greater than 4). Each antenna cell includes a plurality of antenna elements, e.g., 8 antenna elements arranged in 2 rows and 4 columns, where each antenna element is a dual-polarization antenna element. Antenna cells in columns 1 through Y may be designated as antenna cells of a first sub-array (where Y is an integer equal to or greater than 2 and less than L), while antenna cells in columns Y+1 through L may be designated as antenna cells of a second sub-array. The calibration circuitry may perform calibration of the antenna array by: in step 1, for each column of antenna cells of the first sub-array, calibrating antenna elements of the column of antenna cells of the first sub-array with respect to one another (i.e., individually calibrating each column of antenna cells of the first sub-array); in step 2, calibrating antenna elements of different columns (of Y columns) of the antenna cells of the first sub-array with respect to one another (i.e., calibrating different columns of antenna cells of the first sub-array with respect to one another); in step 3, for each column of antenna cells of the second sub-array, calibrating antenna elements of the column of antenna cells of the second sub-array with respect to one another (i.e., individually calibrating each column of antenna cells of the second sub-array); in step 4, calibrating antenna elements of different columns (of L-Y columns) of the antenna cells of the second sub-array with respect to one another (i.e., calibrating different columns of antenna cells of the second sub-array with respect to one another), and, in step 5, calibrating antenna elements of the first sub-array and antenna elements of the second sub-array with respect to one another. Systems and methods for performing calibration of antenna arrays as described herein are suitable for performing calibration of dual-polarization antenna elements and may be particularly beneficial for enabling built-in calibration solutions which can be performed in the field, eliminating the need for, or at least reducing the requirements of, the expensive factory calibrations.

As will be appreciated by one skilled in the art, aspects of the present disclosure, in particular aspects of performing calibration of antenna arrays with dual-polarization antenna elements as proposed herein, may be embodied in various manners—e.g. as a method, a system, a computer program product, or a computer-readable storage medium. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Functions described in this disclosure may be implemented as an algorithm executed by one or more hardware processing units, e.g. one or more microprocessors, of one or more computers. In various embodiments, different steps and portions of the steps of each of the methods described herein may be performed by different processing units. Furthermore, aspects of the present disclosure may take the form of a computer program product embodied in one or more computer readable medium(s), preferably non-transitory, having computer readable program code embodied, e.g., stored, thereon. In various embodiments, such a computer program may, for example, be downloaded (updated) to the existing devices and systems (e.g., to the existing receivers, LIDAR systems, and/or their controllers, etc.) or be stored upon manufacturing of these devices and systems.

The following detailed description presents various descriptions of specific certain embodiments. However, the innovations described herein can be embodied in a multitude of different ways, for example, as defined and covered by the select examples. In the following description, reference is made to the drawings, where like reference numerals can indicate identical or functionally similar elements. It will be understood that elements illustrated in the drawings are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings.

The description may use the phrases "in an embodiment" or "in embodiments," which may each refer to one or more of the same or different embodiments. Unless otherwise specified, the use of the ordinal adjectives "first," "second," and "third," etc., to describe a common object, merely indicate that different instances of like objects are being referred to, and are not intended to imply that the objects so described must be in a given sequence, either temporally, spatially, in ranking or in any other manner. Furthermore, for the purposes of the present disclosure, the phrase "A and/or B" or notation "A/B" means (A), (B), or (A and B), while the phrase "A, B, and/or C" means (A), (B), (C), (A and B), (A and C), (B and C), or (A, B, and C). As used herein, the notation "A/B/C" means (A, B, and/or C). The term "between," when used with reference to measurement ranges, is inclusive of the ends of the measurement ranges.

Various aspects of the illustrative embodiments are described using terms commonly employed by those skilled in the art to convey the substance of their work to others skilled in the art. For example, the term "connected" means a direct electrical connection between the things that are connected, without any intermediary devices/components, while the term "coupled" means either a direct electrical connection between the things that are connected, or an indirect electrical connection through one or more passive or active intermediary devices/components. In another example, the terms "circuit" or "circuitry" (which may be used interchangeably) refer to one or more passive and/or active components that are arranged to cooperate with one another to provide a desired function. Sometimes, in the present descriptions, the term "circuit" may be omitted (e.g., an upconverter and/or downconverter (UDC) circuit may be referred to simply as a "UDC," etc.). If used, the terms "substantially," "approximately," "about," etc., may be used to generally refer to being within +/−20% of a target value, e.g., within +/−10% of a target value, based on the context of a particular value as described herein or as known in the art.

Example Antenna Apparatus

FIG. 1 provides a schematic illustration of an antenna apparatus 100, e.g., a phased array system/apparatus, according to some embodiments of the present disclosure. As shown in FIG. 1, the system 100 may include an antenna array 110, a beamformer array 120, a UDC circuit 140, and a controller 170.

In general, the antenna array 110 may include a plurality of antenna elements 112 (only one of which is labeled with a reference numeral in FIG. 1 in order to not clutter the drawing). In various embodiments, the antenna elements 112 may be radiating elements or passive elements. For example, the antenna elements 112 may include dipoles, open-ended waveguides, slotted waveguides, microstrip antennas, and the like. In some embodiments, the antenna elements 112 may include any suitable elements configured to wirelessly transmit and/or receive RF signals. In particular, each of the antenna elements 112 may be a dual-polarization antenna element.

Various embodiments of the present disclosure related to calibration of antenna arrays with dual-polarization antenna elements such as the antenna elements 112. However, further details shown in FIG. 1, such as the particular arrangement of the beamformer array 120, of the UDC circuit 140, and the relation between the beamformer array 120 and the UDC circuit 140 may be different in different embodiments, with the description of FIG. 1 providing only some examples of how these components may be used together with the array 110 of dual-polarization antenna elements 112. Furthermore, although some embodiments shown in the present drawings illustrate a certain number of antenna elements 112, beamformers, and UDC circuits, it is appreciated that these embodiments may be implemented with an array of any number of these components in accordance with the descriptions provided herein. Furthermore, although the disclosure may discuss certain embodiments as one type of components of an antenna apparatus, it is understood that the embodiments disclosed herein may be implemented with different types of components of an antenna apparatus, such as time domain beamformers, frequency domain beamformers, dynamic antenna arrays, antenna arrays, passive antenna arrays, and the like.

The beamformer array 120 may include a plurality of beamformers 122 (only one of which is labeled with a reference numeral in FIG. 1 in order to not clutter the drawing). The beamformers 122 may be seen as transceivers (e.g., devices which may transmit and/or receive signals, in this case—RF signals) that feed to antenna elements 112. Although not specifically shown in FIG. 1, because the antenna elements 112 are dual-polarization antenna elements, two beamformers 122 may be associated with a single antenna element 112.

In some embodiments, each of the beamformers 122 may include a switch 124 to switch the path from the corresponding antenna element 112 to the receiver or the transmitter path. Although not specifically shown in FIG. 1, in some embodiments, each of the beamformers 122 may also include another switch to switch the path from a signal processor (also not shown) to the receiver or the transmitter path. As shown in FIG. 1, in some embodiments, the transmit path (TX path) of each of the beamformers 122 may include a phase shifter 126 and a variable (e.g., programmable) gain amplifier 128, while the receive path (RX path) may include a phase adjusted 130 and a variable (e.g., programmable) gain amplifier 132. The phase shifter 126 may be configured to adjust the phase of the RF signal to be transmitted (TX signal) by the antenna element 112 and the variable gain amplifier 128 may be configured to adjust the amplitude of the TX signal to be transmitted by the antenna element 112. Similarly, the phase shifter 130 and the variable gain amplifier 132 may be configured to adjust the RF signal received (RX signal) by the antenna element 112 before providing the RX signal to further circuitry, e.g., to the UDC circuit 140, to the signal processor (not shown), etc. The beamformers 122 may be considered to be "in the RF path" of the antenna apparatus 100 because the signals traversing the beamformers 122 are RF signals (i.e., TX signals which may traverse the beamformers 122 are RF signals upconverted by the UDC circuit 140 from lower frequency signals, e.g., from intermediate frequency (IF) signals or from baseband signals, while RX signals which may traverse the beamformers 122 are RF signals which have not yet been downconverted by the UDC circuit 140 to lower frequency signals, e.g., to IF signals or to baseband signals).

Although a switch is shown in FIG. 1 to switch from the transmitter path to the receive path (i.e., the switch 124), in other embodiments of the beamformer 122, other components can be used, such as a duplexer. Furthermore, although FIG. 1 illustrates an embodiment where the beamformers 122 include the phase shifters 126, 130 (which may also be referred to as "phase adjusters") and the variable gain amplifiers 128, 132, in other embodiments, any of the beamformers 122 may include other components to adjust the magnitude and/or the phase of the TX and/or RX signals. In some embodiments, one or more of the beamformers 122 may not include the phase shifter 126 and/or the phase shifter 130 because the desired phase adjustment may, alternatively, be performed using a phase shift module in the local oscillator (LO) path. In other embodiments, phase adjustment performed in the LO path may be combined with phase adjustment performed in the RF path using the phase shifters of the beamformers 122.

Turning to the details of the UDC circuit, in general, the UDC circuit 140 may include an upconverter and/or downconverter circuitry, i.e., in various embodiments, the UDC circuit 140 may include 1) an upconverter circuit but no downconverter circuit, 2) a downconverter circuit but no upconverter circuit, or 3) both an upconverter circuit and a downconverter circuit. As shown in FIG. 1, in some embodiments, the downconverter circuit of the UDC circuit 140 may include an amplifier 142 and a mixer 144, while the upconverter circuit of the UDC circuit 140 may include an amplifier 146 and a mixer 148. In some embodiments, the UDC circuit 140 may further include a phase shift module 150.

In various embodiments, the term "UDC circuit" may be used to include a frequency conversion circuit as such (e.g., a frequency mixer configured to perform upconversion to RF signals for wireless transmission, a frequency mixer configured to perform downconversion of received RF signals, or both), as well as any other components that may be included in a broader meaning of this term, such as filters, analog-to-digital converters (ADCs), digital-to-analog converters (DACs), transformers, and other circuit elements typically used in association with frequency mixers. In all of these variations, the term "UDC circuit" covers implementations where the UDC circuit 140 only includes circuit elements related to the TX path (e.g., only an upconversion mixer but not a downconversion mixer; in such implementations the UDC circuit may be used as/in an RF transmitter for generating RF signals for transmission, e.g., the UDC circuit 140 may enable a calibration probe (also referred to simply as "probe") or an antenna element of the antenna array 110 that is connected to the UDC circuit 140 to act, or be used, as a transmitter), implementations where the UDC circuit 140 only includes circuit elements related to the RX path (e.g., only an downconversion mixer but not an upconversion mixer; in such implementations the UDC circuit 140 may be used as/in an RF receiver to downconvert received RF signals, e.g., the UDC circuit 140 may enable a calibration probe or an antenna element of the antenna array 110 to act, or be used, as a receiver), as well as implementations where the UDC circuit 140 includes, both, circuit elements of the TX path and circuit elements of the RX path (e.g., both the upconversion mixer and the downconversion mixer; in such implementations the UDC circuit 140 may be used as/in an RF transceiver, e.g., the UDC circuit 140 may enable a calibration probe or an antenna element of the antenna array 110 to act, or be used, as a transceiver).

Although a single UDC circuit 140 is illustrated in FIG. 1, multiple UDC circuits 140 may be included in the antenna apparatus 100 to provide upconverted RF signals to and/or receive RF signals to be downconverted from any one of the beamformers 122. Each UDC circuit 140 may be associated with a plurality of beamformers 122 of the beamformer array 120. This is schematically illustrated in FIG. 1 with a dashed line and a dotted line connecting various elements of the beamformer array 120 and the UDC circuit 140. Namely, FIG. 1 illustrates that the dashed line connects the downconverter circuit of the UDC circuit 140 (namely, the amplifier 142) to the RX paths of two different beamformers 122, and that the dotted line connects the upconverter circuit of the UDC circuit 140 (namely, the amplifier 146) to the TX paths of two different beamformers 122. For example, there may be 96 beamformers 122 in the beamformer array 120, associated with 48 dual-polarized antenna elements 112 of the antenna array 110 (in such an example, 48 beamformers 122 would be for receiving and transmitting vertically-polarized (V-polarized) signals and 48 beamformers 122 would be for receiving and transmitting horizontally-polarized (H-polarized) signals).

In some embodiments, the mixer 144 in the downconverter path (i.e., RX path) of the UDC circuit 140 may have [at least] two inputs and one output. One of the inputs of the mixer 144 may include an input from the amplifier 142, which may, e.g., be a low-noise amplifier (LNA). The second input of the mixer 144 may include an input indicative of the LO signal 160. In some embodiments, phase shifting may be implemented in the LO path (additionally or alternatively to the phase shifting in the RF path), in which case the LO signal 160 may be provided, first, to a phase shift module 150, and then a phase-shifted LO signal 160 is provided as the second input to the mixer 144. In the embodiments where phase shifting in the LO path is not implemented, the phase shift module 150 may be absent and the second input of the mixer 144 may be configured to receive the LO signal 160. The one output of the mixer 144 is an output to provide the downconverted signal 156, which may, e.g., be an IF signal 156. The mixer 144 may be configured to receive an RF RX signal from the RX path of one of the beamformers 122, after it has been amplified by the amplifier 142, at its first input and receive either a signal from the phase shift module 150 or the LO signal 160 itself at its second input, and mix these two signals to downconvert the RF RX signal to an lower frequency, producing the downconverted RX signal 156, e.g., the RX signal at the IF. Thus, the mixer 144 in the downconverter path of the UDC circuit 140 may be referred to as a "downconverting mixer."

In some embodiments, the mixer 148 in the upconverter path (i.e., TX path) of the UDC circuit 140 may have [at least] two inputs and one output. The first input of the mixer 148 may be an input for receiving a TX signal 158 of a lower frequency, e.g., the TX signal at IF. The second input of the mixer 148 may include an input indicative of the LO signal 160. In the embodiments where phase shifting is implemented in the LO path (either additionally or alternatively to the phase shifting in the RF path), the LO signal 160 may be provided, first, to a phase shift module 150, and then a phase-shifted LO signal 160 is provided as the second input to the mixer 148. In the embodiments where phase shifting in the LO path is not implemented, the phase shift module 150 may be absent and the second input of the mixer 148 may be configured to receive the LO signal 160. The one output of the mixer 148 is an output to the amplifier 146, which may, e.g., be a power amplifier (PA). The mixer 148 may be configured to receive an IF TX signal 158 (i.e., the lower frequency, e.g. IF, signal to be transmitted) at its first input and receive either a signal from the phase shift module 150 or the LO signal 160 itself at its second input, and mix these two signals to upconvert the IF TX signal to the desired RF frequency, producing the upconverted RF TX signal to be provided, after it has been amplified by the amplifier 146, to the TX path of one of the beamformers 122. Thus, the mixer 148 in the upconverter path of the UDC circuit 140 may be referred to as a "upconverting mixer."

As is known in communications and electronic engineering, an IF is a frequency to which a carrier wave is shifted as an intermediate step in transmission or reception. The IF signal is created by mixing the carrier signal with an LO signal in a process called heterodyning, resulting in a signal at the difference or beat frequency. Conversion to IF may be useful for several reasons. One reason is that, when several stages of filters are used, they can all be set to a fixed frequency, which makes them easier to build and to tune. Another reason is that lower frequency transistors generally have higher gains so fewer stages may be required. Yet another reason is to improve frequency selectivity because it may be easier to make sharply selective filters at lower fixed frequencies. It should also be noted that, while some descriptions provided herein refer to signals 156 and 158 as IF signals, these descriptions are equally applicable to embodiments where signals 156 and 158 are baseband signals. In such embodiments, frequency mixing of the mixers 144 and 148 may be a zero-IF mixing (also referred to as a "zero-IF conversion") in which the LO signal 160 used to perform the mixing may have a center frequency in the band of RF RX/TX frequencies.

Although not specifically shown in FIG. 1, in further embodiments, the UDC circuit 140 may further include a balancer, e.g., in each of the TX and RX paths, configured to mitigate imbalances in the in-phase and quadrature (IQ) signals due to mismatching. Furthermore, although also not specifically shown in FIG. 1, in other embodiments, the antenna apparatus 100 may include further instances of a combination of the antenna array 110, the beamformer array 120, and the UDC circuit 140 as described herein, e.g., a combination described with reference to FIG. 2.

The controller 170 may include any suitable device, configured to control operation of various parts of the antenna apparatus 100. For example, in some embodiments, the controller 170 may control the amount and the timing of phase shifting implemented in the antenna apparatus 100. In another example, in some embodiments, the controller 170 may control calibration of the dual-polarization antenna elements 112 according to the techniques described herein. To that end, the controller 170 may be configured to enable various components of the antenna apparatus 100 to function as described herein in order to carry out the calibration. In some embodiments, the controller 170 may be implemented as, or include portions of, a data processing system shown in FIG. 12.

The antenna apparatus 100 can steer an electromagnetic radiation pattern of the antenna array 110 in a particular direction, thereby enabling the antenna array 110 to generate a main beam in that direction and side lobes in other directions. The main beam of the radiation pattern is generated based on constructive inference of the transmitted RF signals based on the transmitted signals' phases. The side lobe levels may be determined by the amplitudes of the RF signals transmitted by the antenna elements. The antenna apparatus 100 can generate desired antenna patterns by providing phase shifter settings for the antenna elements 112, e.g., using the phase shifters of the beamformers 122 and/or the phase shift module 150.

It is possible that, over time, the amplitudes of signals and the relative phases among the antenna elements 112 can drift from the values set when the antenna apparatus 100 was originally calibrated. The drift can cause the antenna pattern to degrade, which can, for example, reduce the gain in a main lobe. In such situations, calibration may be used to accurately measure and control the phase and amplitude of the antenna elements 112 even after the antenna apparatus 100 has been deployed in the field. Because the antenna elements 112 are dual-polarization antenna elements, their calibration is not trivial because it's not easy to find suitable symmetric configuration of antenna elements and probes that may be used for calibration. However, techniques described herein provide a way to perform calibration of dual-polarization antenna elements.

Calibrating an Array of Dual-Polarization Antenna Elements

Figure 2:
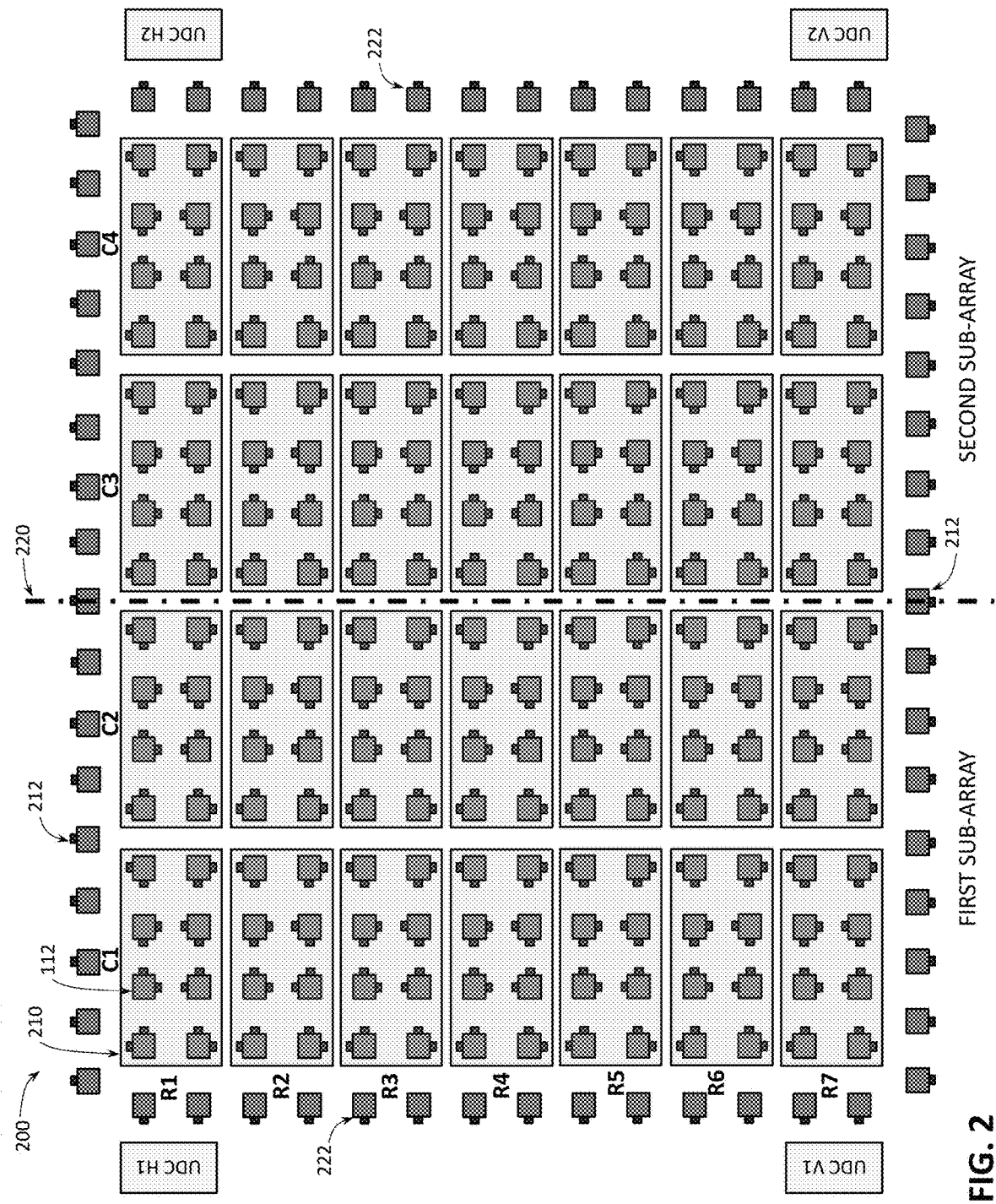
FIG. 2 provides a schematic illustration of an example antenna apparatus that may be used for calibrating an antenna array with dual-polarization antenna elements, according to some embodiments of the present disclosure.

FIG. 2 provides a schematic illustration of an example antenna apparatus 200 that may be used for calibrating an antenna array with dual-polarization antenna elements, according to some embodiments of the present disclosure. The antenna apparatus 200 may be an example of the antenna apparatus 100 shown in FIG. 1.

As shown in FIG. 2, the antenna apparatus 200 includes a plurality of dual-polarization antenna elements 112 as described above (only one of which is labeled in FIG. 2 in order to not clutter the drawing). The fact that each antenna element 112 is a dual-polarization antenna element is schematically illustrated in FIG. 2 with each antenna element 112 including two input/output (I/O) ports, which may also be referred to as "feedlines" (shown as little dark squares on two different sides of the antenna element 112). The antenna elements 112 of the antenna apparatus 200 may be arranged in N rows and M columns, where N and M are integers. Typically, N and M would be integers greater than 4. The example shown in FIG. 2 illustrates 14 rows and 16 columns of the antenna elements 112, but in other embodiments any other suitable number may be used, in accordance with the descriptions provided herein. The antenna elements 112 with two I/O ports, shown in FIG. 2, may be referred to as "active antenna elements" to differentiate them from antenna elements that may be referred to as "calibration antenna elements" 212 (only two of which are labeled in FIG. 2 in order to not clutter the drawing—one shown in FIG. 2 for the row of antenna elements with only one I/O port that are provided above the first row of the antenna elements 112, and one shown in FIG. 2 for the row of antenna elements with only one I/O port that are provided below the last row of the antenna elements 112) and from antenna elements that may be referred to as "dummy antenna elements" 222 (only two of which are labeled in FIG. 2 in order to not clutter the drawing—one shown in FIG. 2 for the column of antenna elements with only one I/O port that are provided before (i.e., to the left of) the first column of the antenna elements 112, and one shown in FIG. 2 for the column of antenna elements with only one I/O port that are provided after (i.e., to the right of) the last column of the antenna elements 112). The differences between the active antenna elements 112, the calibration antenna element 212, and the dummy antenna elements 222 is that the active antenna elements 112 may be used to actively receive/transmit RF signals to enable desired functionality of the antenna apparatus 200, while the calibration antenna elements 212 may be provided for the purpose of calibration and the dummy antenna elements 222 may be provided for the purpose of impedance matching.

As further shown in FIG. 2, the antenna elements 112 may be arranged into groups that may be referred to as "antenna cells" 210. Only one antenna cell 210 is labeled in FIG. 2 in order to not clutter the drawing, but other antenna cells 210 indicated in FIG. 2 with gray rectangles surrounding different groups of 8 antenna elements 112. Thus, in some embodiments of the antenna apparatus 200, each antenna cell 210 may include 8 antenna elements 112, arranged in 2 rows and 4 columns, and having their I/O ports oriented as shown in FIG. 2 in order to realize a unit of antenna elements 112 that may be repeated to form an ordered array of symmetrically arranged antenna cells 210. The antenna cells 210 of the antenna apparatus 200 may be arranged in K rows and L columns, where K and L are integers. In some embodiments, K may be an integer equal to or greater than 3, while L may be an integer equal to or greater than 4. The example shown in FIG. 2 illustrates 7 rows of the antenna cells 210 (labeled in FIG. 2 as R1, R2, . . . , and R7) and 4 columns of the antenna cells 210 (labeled in FIG. 2 as C1, C2, C3, and C4), but in other embodiments any other suitable number of rows and columns of the antenna cells 210 may be used, in accordance with the descriptions provided herein. Furthermore, the antenna cells 210 may be arranged in what is referred to as a "first sub-array" and a "second sub-array" (labeled at the bottom of FIG. 2 as "sub-array 1" and "sub-array 2"). The first sub-array may include antenna cells 210 of columns 1 through Y of antenna cells 210, while the second sub-array may include antenna cells 210 of columns Y+1 through L of antenna cells 210. For the example shown in FIG. 2, Y=2, which means that the first two columns of the antenna cells 210, C1 and C2, belong to the first sub-array (i.e., the antenna cells 210 shown in FIG. 2 to the left of the dotted-dashed line 220), while the last two columns of the antenna cells 210, C3 and C4, belong to the second sub-array (i.e., the antenna cells 210 shown in FIG. 2 to the right of the dotted-dashed line 220). In other embodiments of the antenna apparatus 200, any of the first and second sub-arrays may include any number of one or more columns, and, contrary to the illustration of the example of FIG. 2, the number of columns of the antenna cells 210 in the first sub-array may not be equal to the number of columns of the antenna cells 210 in the second sub-array.

Each of the antenna cells 210 may be associated with what may be referred to as a "beamformer group" (not specifically labeled in FIG. 2). A beamformer group for the plurality of the antenna elements 112 of a given antenna cell 210 may include 16 beamformers 122, described above, i.e., the number of beamformers of a beamformer group is double the number of the antenna elements 112 in the cell 210 because half of the beamformers 122 of the beamformer group is used for handling H-polarized signals and the other half of the beamformers 122 is used for handling V-polarized signals. Thus, as FIG. 1 illustrates a single beamformer 122 coupled to a given antenna element 112, in the antenna apparatus 200, for a given antenna element 112, one beamformer 122 is coupled to one I/O port of the antenna element 112 (which beamformer is configured to exchange H-polarized signals with the antenna element 112), while another beamformer 122 is coupled to the other I/O port of the antenna element 112 (which beamformer is configured to exchange V-polarized signals with the antenna element 112). For the example of the antenna apparatus 200 as shown in FIG. 2, where 28 antenna cells 210 are shown (7 rows, 4 columns), this means that the beamformer array 120 would include 448 beamformers 122 (16 beamformers per antenna cell 210, 16*28=448), arranged into 28 beamformer groups of 16 beamformers, each beamformer group associated with (i.e., coupled to) a respective antenna cell 210. In other embodiments, an antenna cell 210 may include another number, P, of two or more antenna elements 112, in which case a corresponding beamformer group would include 2P beamformers 122.

Each antenna cell 210 may be coupled to two different UDC circuits such as the UDC circuit 140, via the corresponding beamformer group. In other words, each beamformer group associated with a given antenna cell 210 may be coupled to two different UDC circuits. One of the UDC circuits coupled to a given antenna cell 210 may be used for handling H-polarized signals and the other one of the UDC circuits coupled to a given antenna cell 210 may be used for handling V-polarized signals. Furthermore, in some embodiments, 2 UDC circuits may be shared among a plurality of the antenna cells 210 of the first sub-array, while another 2 UDC circuits may be shared among a plurality of the antenna cells 210 of the second sub-array. For example, as shown in FIG. 2, in some embodiments, the antenna apparatus 200 may include a first UDC circuit (labeled in FIG. 2 as "UDC H1") and a second UDC circuit (labeled in FIG. 2 as "UDC V1") associated with (e.g., coupled to) various antenna cells 210 of the first sub-array, and may further include a first UDC circuit (labeled in FIG. 2 as "UDC H2") and a second UDC circuit (labeled in FIG. 2 as "UDC V2") associated with (e.g., coupled to) various antenna cells 210 of the second sub-array. Each of these UDC circuits may be implemented as the UDC circuit 140, described above.

Turning to the UDC circuits of the first sub-array, the UDC H1 may be shared among (i.e., coupled to each of) a first sub-set of the plurality of the beamformers 122 of the beamformer groups associated with the antenna cells 210 of the first sub-array, while the UDC V1 may be shared among (i.e., coupled to each of) a second sub-set of the plurality of the beamformers 122 of the beamformer groups associated with the antenna cells 210 of the first sub-array. The first sub-set includes the beamformers 122 of the first sub-array used for H-polarized signals (hence, the letter "H" in the notation of the UDC H1, while the number "1" in this notation refers to the fact that this UDC is associated with the first sub-array of the antenna cells 210), while the second sub-set includes the beamformers 122 of the first sub-array used for V-polarized signals (hence, the letter "V" in the notation of the UDC V1, while the number "1" in this notation refers to the fact that this UDC is associated with the first sub-array of the antenna cells 210). For the example shown in FIG. 2, the UDC H1 may be coupled to a total of 112 beamformers 122 coupled to the H-polarization I/O ports of the 112 antenna elements 112 of the first sub-array (8 antenna elements 112 per antenna cell 210, 7 rows and 2 columns of the antenna cells 210 in the first sub-array, so 8*7*2=112), and the UDC V1 may be coupled to the other 112 beamformers 122 of the first sub-array, namely, the beamformers 122 coupled to the V-polarization I/O ports of the 112 antenna elements 112 of the first sub-array. In some embodiments, the UDC H1 may be coupled to the associated H-polarization beamformers 122 of the first sub-array of the antenna apparatus 200 similar to how the UDC circuit 140 is shown to be coupled to the plurality of beamformers of the beamformer array 120 in the antenna apparatus 100. Similarly, the UDC V1 may be coupled to the associated V-polarization beamformers 122 of the first sub-array of the antenna apparatus 200 similar to how the UDC circuit 140 is shown to be coupled to the plurality of beamformers of the beamformer array 120 in the antenna apparatus 100 (i.e., the UDC V1 and the UDC H1 are 2 different instances of the UDC circuit 140, where FIG. 1 only illustrates one UDC circuit 140).

Analogous description applied to the UDC circuits of the second sub-array, where the UDC H2 may be shared among (i.e., coupled to each of) a first sub-set of the plurality of the beamformers 122 of the beamformer groups associated with the antenna cells 210 of the second sub-array, and the UDC V2 may be shared among (i.e., coupled to each of) a second sub-set of the plurality of the beamformers 122 of the beamformer groups associated with the antenna cells 210 of the second sub-array. In this case, the first sub-set includes the beamformers 122 of the second sub-array used for H-polarized signals (hence, the letter "H" in the notation of the UDC H2, while the number "2" in this notation refers to the fact that this UDC is associated with the second sub-array of the antenna cells 210), while the second sub-set includes the beamformers 122 of the second sub-array used for V-polarized signals (hence, the letter "V" in the notation of the UDC V2, while the number "2" in this notation refers to the fact that this UDC is associated with the second sub-array of the antenna cells 210). For the example shown in FIG. 2, the UDC H2 may be coupled to a total of 112 beamformers 122 coupled to the H-polarization I/O ports of the 112 antenna elements 112 of the second sub-array (8 antenna elements 112 per antenna cell 210, 7 rows and 2 columns of the antenna cells 210 in the second sub-array, so 8*7*2=112), and the UDC V2 may be coupled to the other 112 beamformers 122 of the second sub-array, namely, the beamformers 122 coupled to the V-polarization I/O ports of the 112 antenna elements 112 of the second sub-array. In some embodiments, the UDC H2 may be coupled to the associated H-polarization beamformers 122 of the second sub-array of the antenna apparatus 200 similar to how the UDC circuit 140 is shown to be coupled to the plurality of beamformers of the beamformer array 120 in the antenna apparatus 100. Similarly, the UDC V2 may be coupled to the associated V-polarization beamformers 122 of the second sub-array of the antenna apparatus 200 similar to how the UDC circuit 140 is shown to be coupled to the plurality of beamformers of the beamformer array 120 in the antenna apparatus 100 (i.e., the UDC V2 and the UDC H2 are 2 further instances of the UDC circuit 140, which means that the antenna apparatus 200 may include a total of 4 instances of the UDC circuit 140, where FIG. 1 only illustrates one UDC circuit 140).

Figure 5A:
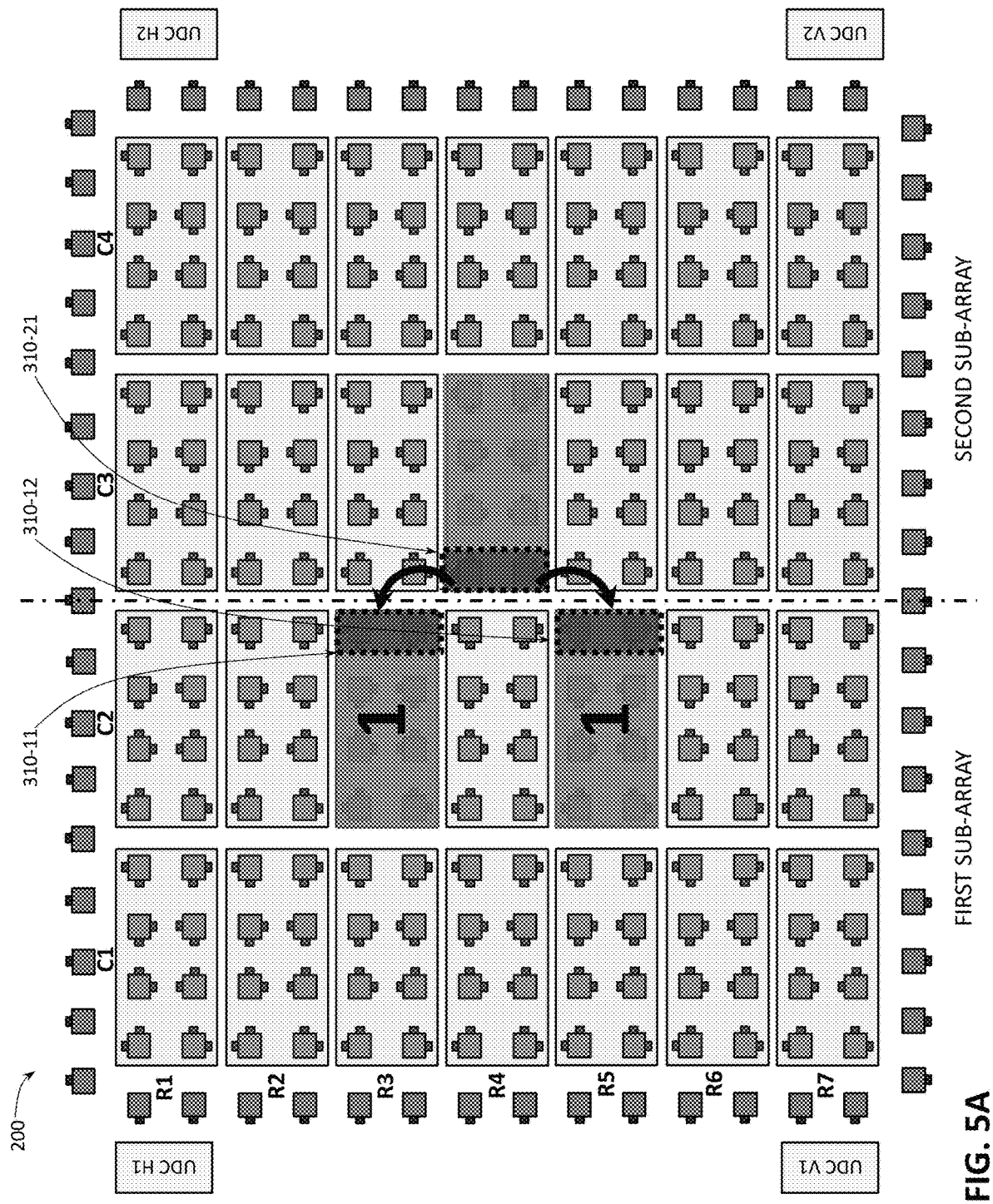
Figure 6A:
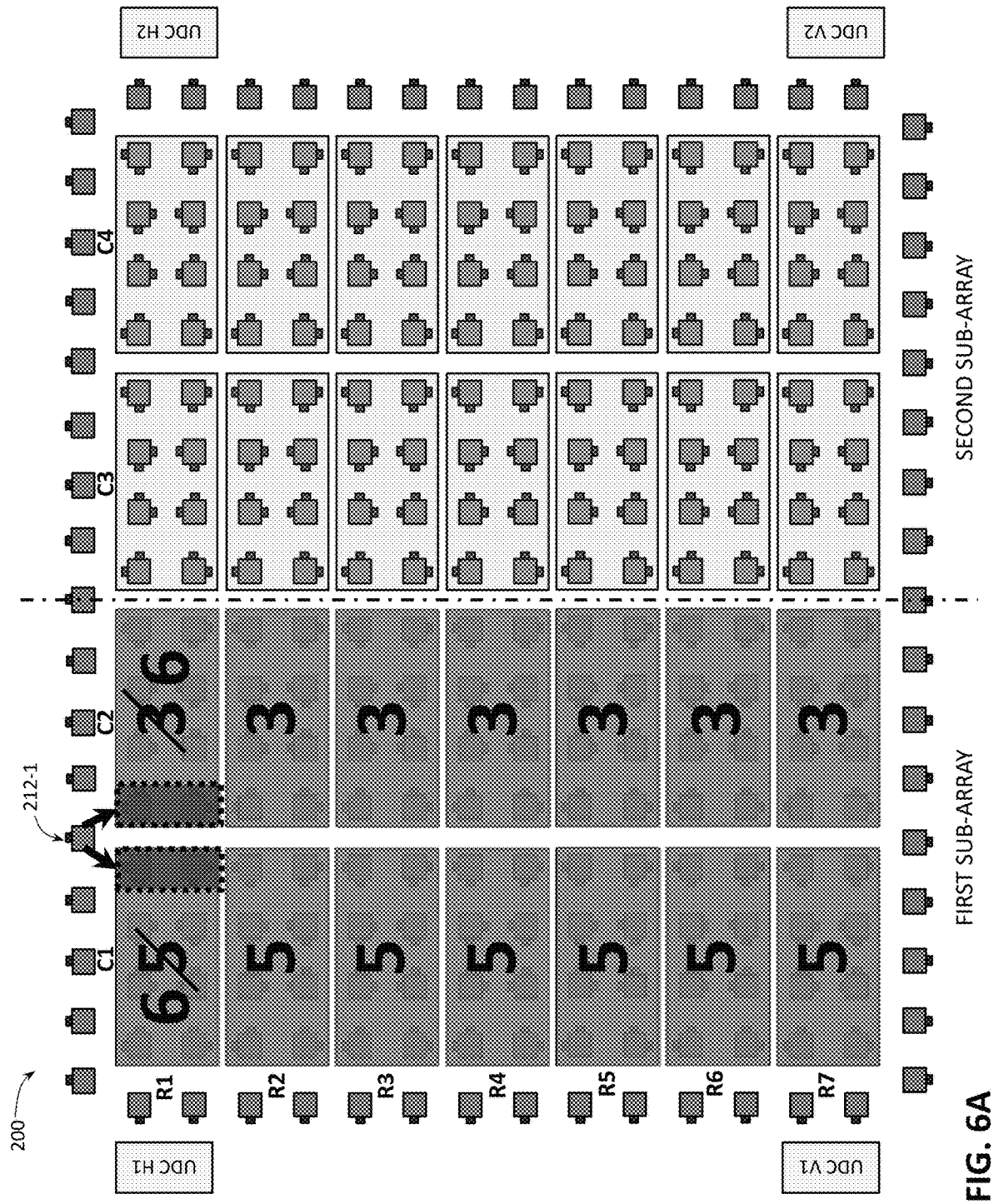
FIGS. 6A-6B provide schematic illustrations of different states of performing step 2 of the calibration method of FIG. 4 for the antenna apparatus of FIG. 2, according to some embodiments of the present disclosure.
Figure 7A:
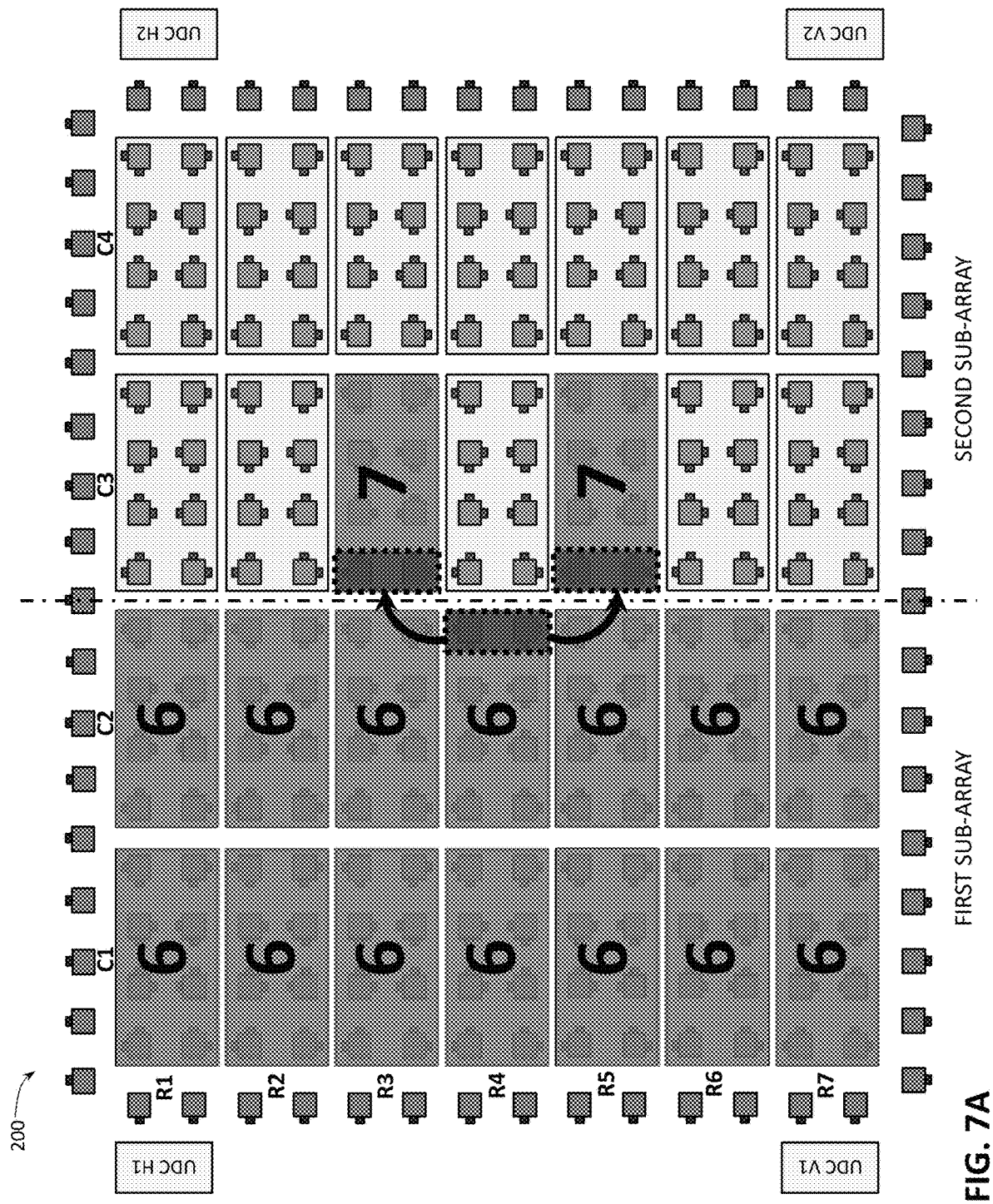
FIGS. 7A-7D provide schematic illustrations of different states of performing step 3 of the calibration method of FIG. 4 for the antenna apparatus of FIG. 2, according to some embodiments of the present disclosure.
Figure 9A:
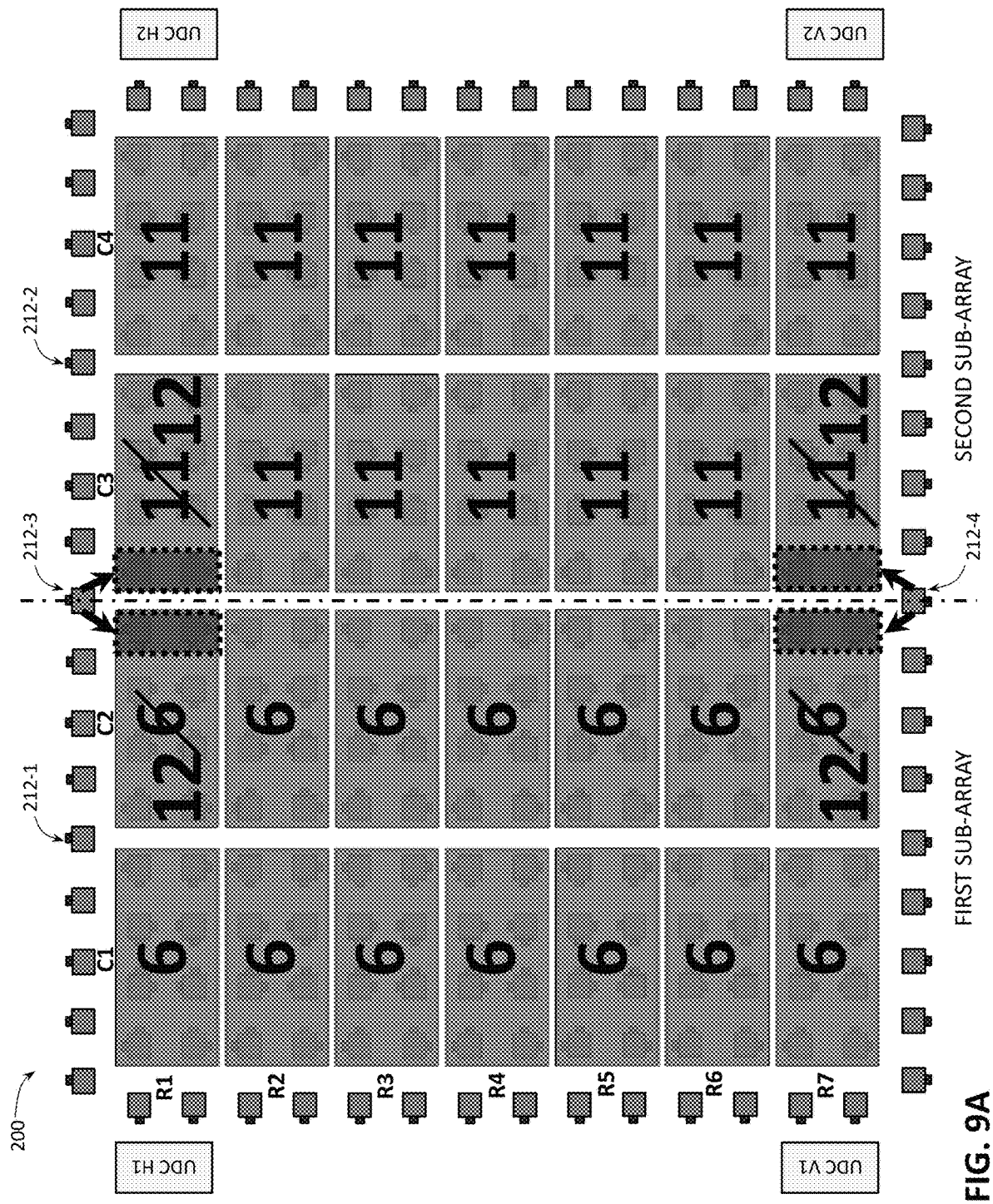
FIGS. 9A-9B provide schematic illustrations of different states of performing step 5 of the calibration method of FIG. 4 for the antenna apparatus of FIG. 2, according to some embodiments of the present disclosure.

As is illustrated in the example of FIG. 2, the antenna elements 112 of a given antenna cell 210 are arranged so that different antenna cells 210 may be placed symmetric to one another, which is important for proper calibration of the different antenna elements 112 according to the calibration methods described herein. In the following, methods for performing calibration of antenna arrays with dual-polarization antenna elements will be described with reference to a calibration probe exchanging RF signals with two antenna cells 210 to be calibrated (such antenna cells referred to in the following as "target antenna cells" because they are the target of the calibration). A "probe" is a general term for an antenna element that may include any of conductive structures (e.g., probe lines, slots, monopoles, small patches, other coupling structures, etc.) that can wirelessly transmit and/or receive RF signals that may be used for calibration purposes as described herein. As will be explained below, in some steps of the calibration process disclosed herein, antenna elements 112 of one of the antenna cells 210 may act as a calibration probe for calibrating two other antenna cells 210 with respect to one another (e.g., as is shown in FIG. 5A or FIG. 7A). However, in other steps of the calibration process disclosed herein, a probe that is not one of the antenna elements 112, e.g., a probe implemented as one of the calibration antenna elements 212, may act as a calibration probe for calibrating two target antenna cells 210 with respect to one another (e.g., as is shown in FIG. 6A or FIG. 9A).

Exchanging the RF signals between the target antenna cells 210 and the probe allows equalizing the two antenna cells 210 with respect to one another in terms of phase and gain (i.e., amplitude) (in other words, it allows calibrating the two target antenna cells 210 with respect to one another). The two target antenna cells 210 may be placed substantially symmetrically with respect to the probe. Using a probe that is placed symmetrically between (e.g., equidistant to) the two target antenna cells 210 to be calibrated with respect to one another may reduce or eliminate the possible variation that may occur in the propagation of the radiation pattern to/from the probe and the target antenna cells 210. Finding such symmetry points for the optimal use of a probe is not trivial for dual-polarization antenna elements 112 that include two I/O ports because, ideally, the probe should be placed symmetrically with respect to the locations of the I/O ports of the antenna elements 112 of target antenna cells 210. Therefore, having a symmetric arrangement of the antenna elements 112 within an antenna array, both with respect to the locations of different antenna cells 210 of the array with respect to one another and with respect to the positions of the two I/O ports of each of the dual-polarized antenna elements 112 is important for finding an optimal location and manner of using a calibration probe.

Finding a symmetry point for dual-polarization antenna elements 112 is particularly challenging if one of the antenna cells 210 is to be used as a probe (which would be desirable in terms of re-using the existing circuitry and reducing the amount of additional circuitry that has to be included for calibration purposes). An example illustration of such a scenario is shown in FIG. 3.

Figure 3:
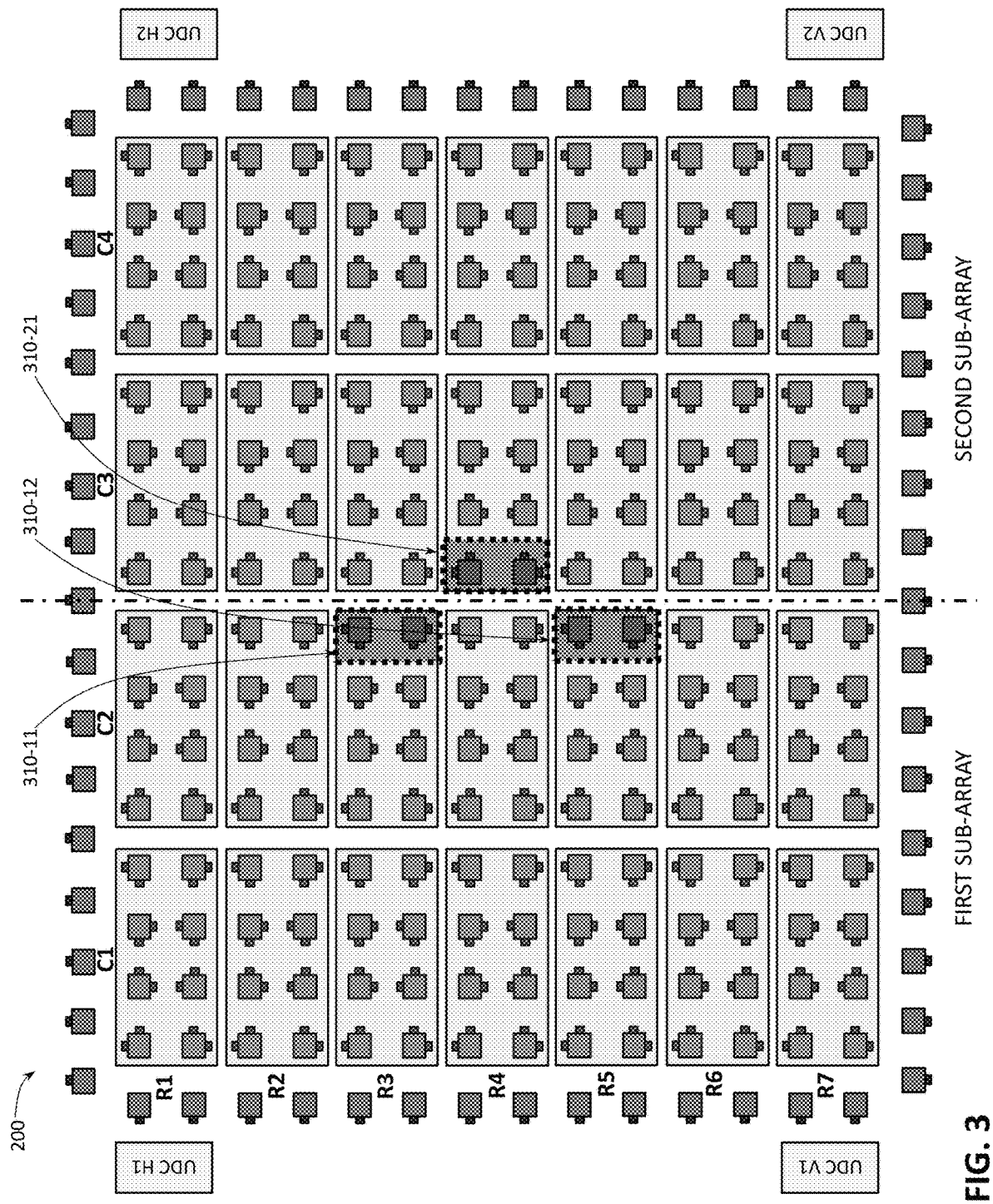
FIG. 3 provides a schematic illustration of an example group of antenna elements of the second sub-array that is symmetric with respect to two example groups of antenna elements of the first sub-array in the example antenna apparatus of FIG. 2, according to some embodiments of the present disclosure.

FIG. 3 provides a schematic illustration of an example group of antenna elements of the second sub-array that is symmetric (both in position as well as in the locations of the I/O ports) with respect to two example groups of antenna elements of the first sub-array in the example antenna apparatus of FIG. 2, according to some embodiments of the present disclosure. In particular, FIG. 3 illustrates the antenna apparatus 200 as described above, except that some reference numerals shown in FIG. 2 are not shown in FIG. 3 in order to not clutter the drawing. In the following, an antenna cell 210 in a given row and a given column may be referred to by abbreviating its row and column numbers. For example, the antenna cell 210 that is in row R3, column C2 of the antenna apparatus 200 may be referred to as an antenna cell "R3C2," while the antenna cell 210 that is in row R4, column C3 of the antenna apparatus 200 may be referred to as an antenna cell "R4C3," and so on.

As shown in FIG. 3, a group 310-21 of 2 antenna cells 112 of the antenna cell R4C3 of the second sub-array is symmetric (both in terms of the position of the antenna cells 112 and in terms of the locations of their I/O ports) with respect to a group 310-11 of two antenna cells 112 of the antenna cell R3C2 of the first sub-array. The group 310-21 is also symmetric (again, both in terms of the position of the antenna cells 112 and in terms of the locations of their I/O ports) with respect to a group 310-12 of two antenna cells 112 of the antenna cell R5C2 of the first sub-array. Furthermore, the group 310-11 and the group 310-12 are symmetric with respect to the group 310-21. With such an arrangement, the group 310-21 may be used as a probe for calibrating the antenna elements 112 of the groups 310-11 and 310-12 with respect to one another. Thus, exchanging RF signals between the antenna elements 112 of the group 310-21 and each of the group 310-11 and the group 310-12 may be used to calibrate the antenna elements 112 of the group 310-11 with respect to the antenna elements 112 of the group 310-12. For a given antenna cell 210, all antenna elements 112 of the antenna cell 210 may be assumed to be calibrated with respect to one another, which means that calibrating the antenna elements 112 of the group 310-11 with respect to the antenna elements 112 of the group 310-12 effectively calibrates all antenna elements 112 of the antenna cell R3C2 (i.e., the antenna cell to which the group 310-11 belongs) with respect to all antenna elements 112 of the antenna cell R5C2 of the first sub-array (i.e., the antenna cell to which the group 310-12 belongs). If the antenna elements 112 were single-polarization then it would have been easy to find a symmetry point and a single antenna element 112 could have been used as a probe. However, because of the dual-polarization, each antenna element 112 includes two I/O ports, so at least two different antenna elements 112 have to be used as a probe to calibrate at least two antenna elements 112 in each of the target antenna cells 210 with respect to one another. The following descriptions are provided with respect to using such groups of two antenna elements of a given antenna cell 210 for calibration, but, in further embodiments of the present disclosure, these groups could include any other number of antenna elements of a given antenna cell 210 as long as the symmetry considerations described herein still hold. For example, in some embodiments of the scenario shown in FIG. 3, the group 310-21 could be a group of 4 antenna elements 112 of the antenna cell R4C3 by also including the two antenna elements 112 of this cell shown directly to the right of the two highlighted antenna elements 112. In another example, each of the groups 310-11 and 310-12 could be a group of 4 antenna elements 112 of the antenna cells R3C2 and R5C2, respectively, by also including the two antenna elements 112 of these cell shown directly to the left of the two highlighted antenna elements 112 of these cells.

Various manners for calibrating antenna elements using a probe are known in the art and, therefore, are not described herein in detail. At a high level, calibrating the antenna elements 112 of the two antenna cells 210 with respect to one another using a probe refers to performing any suitable calibration based on near-field radiation measurements to accurately measure and control the phase and amplitude of antenna elements in an array system even after an antenna array has been fielded. To that end, a probe may be placed between the target antenna cells 210 to be calibrated (e.g., between the antenna elements 112 of the two antenna cells 210 of the first sub-array highlighted in FIG. 5A) and the near-field radiation measurements may be performed based on the RF signals exchanged between the probe and the target antenna cells 210, in order to measure phase and/or amplitude of the antenna elements of the target antenna cells 210. Then, the phase or amplitude of the exchanged RF signals can be assessed to determine adjustments that are made to the transmitter, receiver, or transceiver connected to the antenna elements of the target antenna cells 210, resulting in these antenna cells 210 being calibrated with respect to one another. In some embodiments, the antenna elements of the target antenna cells 210 can be configured to transmit signals to the probe, the probe receiving the transmitted signals. In such embodiments, the probe can detect power (e.g., by using a power detector) and/or phase (e.g., by using a mixer). In some embodiments, the probe can be used as a transmitter, transmitting RF signals to the antenna elements of the target antenna cells 210, where these antenna elements receive the transmitted signal and detect power and/or phase. In some embodiments, the measured calibration data may be used by the corresponding beamformers 122 and combined with other data, such as pre-calculated or pre-stored antenna pattern data, to generate appropriate settings for beamforming. Because the antenna elements 112 are dual-polarization antenna elements, each calibration step may be performed as a two-step process, where, in a first step, RF signals are exchanged to perform calibration for one polarization, and, in a second step, RF signals are exchanged to perform calibration for the other polarization (e.g., first, RF signals are exchanged for calibrating with respect to the H-polarized signals, and, second, for RF signals are exchanged for calibrating with respect to the V-polarized signals, or vice versa).

Figure 4:
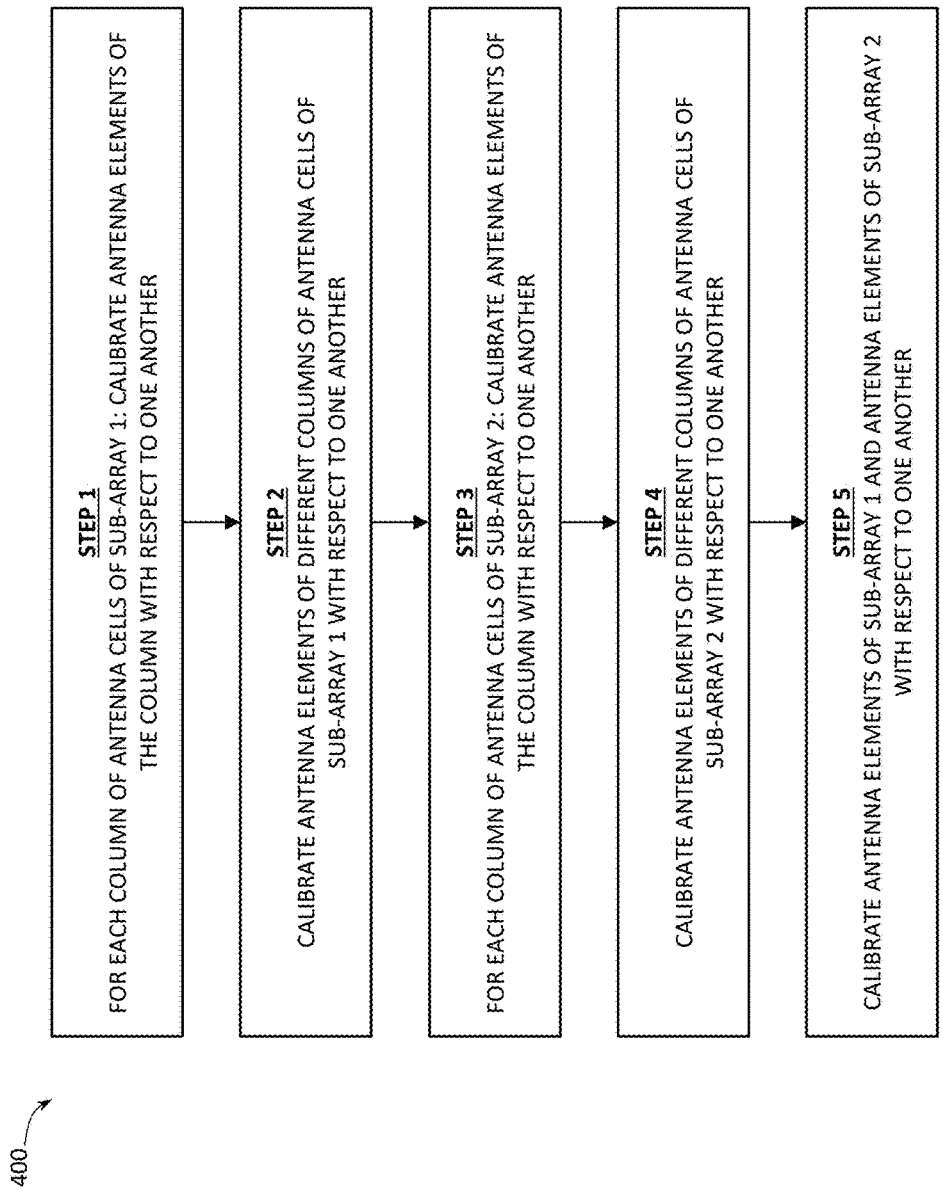
FIG. 4 provides a block diagram illustrating a method for performing calibration of an antenna array with dual-polarization antenna elements, according to some embodiments of the present disclosure.

FIG. 4 provides a block diagram illustrating a method 400 for performing calibration of an antenna array with dual-polarization antenna elements, according to some embodiments of the present disclosure. FIGS. 5-9 provide schematic illustrations of different states of performing different steps of the method 400. Although description of the method 400 refers to the components of the antenna apparatus 200 shown in FIG. 2, and each of FIGS. 5-9 provide illustrations of different states for the example of the antenna apparatus 200 shown in FIG. 2, in other embodiments, the method 400 may be implemented with various other antenna devices similar to the antenna apparatus 200, in accordance with the descriptions provided herein. Each of FIGS. 5-9 illustrates the antenna apparatus 200 as described above, except that some reference numerals shown in FIG. 2 are not shown in FIGS. 5-9 in order to not clutter the drawings.

The method 400 may begin with step 1, which includes, for each column of the antenna cells 210 of the first sub-array, calibrating the antenna elements 112 of this column of the antenna cells 210 with respect to one another. In other words, step 1 includes performing calibration by individually calibrating each column of antenna cells 210 of the first sub-array. FIGS. 5A-5I provide schematic illustrations of different states of performing step 1 of the calibration method 400 for the antenna apparatus 200 of FIG. 2, according to some embodiments of the present disclosure.

As shown in FIG. 5A, step 1 may include the group 310-21 of the antenna cells 112 of the of the antenna cell R4C3 of the second sub-array exchanging RF signals with each of the group 310-11 and the group 310-12 in order to calibrate the antenna elements 112 of the antenna cell R3C2 with the antenna elements 112 of the antenna cell R5C2. The antenna cells 210 which are exchanging signals for calibration purposes are shown in FIG. 5A with a gray overlap covering all of the antenna elements of these cells, and the big number "1" on each of the two antenna cells of the first sub-array illustrates that these two antenna cells 210 are the ones being calibrated with respect to one another (i.e., that these are the target antenna cells 210 being calibrated) and may then both be considered to be in the same calibrated state (i.e., the one denoted with the number "1"). Analogous notation is used for the remainder of FIGS. 5-9.

In the arrangement shown in FIG. 5A, the group 310-21 of the antenna cells 112 of the of the antenna cell R4C3 of the second sub-array acts as a probe for the calibration of the antenna cells R3C2 and R5C2 of the first sub-array. In this arrangement, the probe is symmetric with respect to each of the target antenna cells and the target antenna cells are symmetric with respect to one another in their relation to the probe. The calibration is performed first for one polarization and then for another polarization. Because each of the target antenna cells of this arrangement uses the same UDC circuit for each polarization, RF signals exchanged between the probe and each of the target antenna cells sequentially. For example, first, calibration measurements may be performed for the antenna cell R3C2 for H-polarization. In this case, the antenna cell R3C2 is coupled to the UDC H1, and the probe antenna cell R4C3 is coupled to the UDC H2. These two antenna cells exchange RF signals as described above to obtain phase and amplitude measurements to be used for calibration of the antenna cell R3C2 with respect to H-polarization. At that time, the antenna cell R5C2 is not connected to the UDC H1 because only a single antenna cell at a time may be connected to each UDC circuit. Later, calibration measurements may be performed for the antenna cell R5C2 for H-polarization. In this case, the antenna cell R5C2 is coupled to the UDC H1 (and the antenna cell R3C2 is no longer coupled to the UDC H1), and the probe antenna cell R4C3 is still coupled to the UDC H2. These two antenna cells exchange RF signals as described above to obtain phase and amplitude measurements to be used for calibration of the antenna cell R5C2 with respect to H-polarization. Then the H-polarization measurements performed for the antenna cells R3C2 and R5C2 sequentially may be used to calibrate these two antenna cells with respect to one another in terms of H-polarization. The same process may then be repeated for the V-polarization, where the probe antenna cell R4C3 is coupled to the UDC V2 and the antenna cells R3C2 and R5C2 are coupled to the UDC V1 sequentially to obtain the calibration measurements for the V-polarization.

Figure 5B:
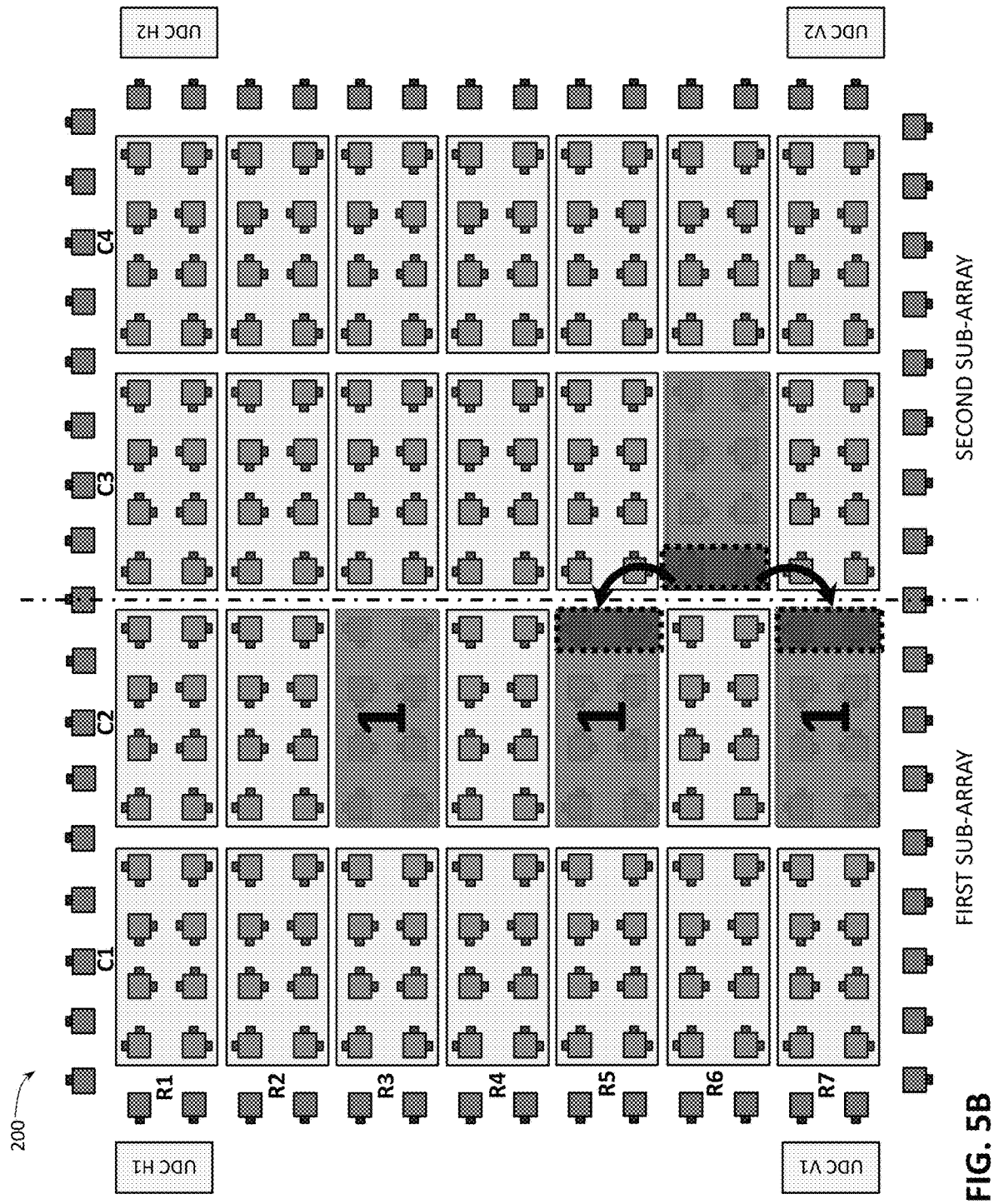

FIG. 5B illustrates that step 1 may further include using the antenna cell R6C3 of the second sub-array as a probe for calibrating the antenna cells R5C2 and R7C2 of the first sub-array with respect to one another. The calibration illustrated in FIG. 5B may be performed analogously to that described for the antenna cells illustrated in FIG. 5A, and, therefore, in the interest of brevity, this description is not repeated. Because the antenna cell R5C2 was previously calibrated with respect to the antenna cell R3C2, as a result of calibrating the antenna cell R5C2 now with respect to the antenna cell R7C2, all three of the antenna cells R3C2, R5C2, and R7C2 are calibrated with respect to one another, as indicated in FIG. 5B with the number "1" shown over each of these antenna cells.

Figure 5C:
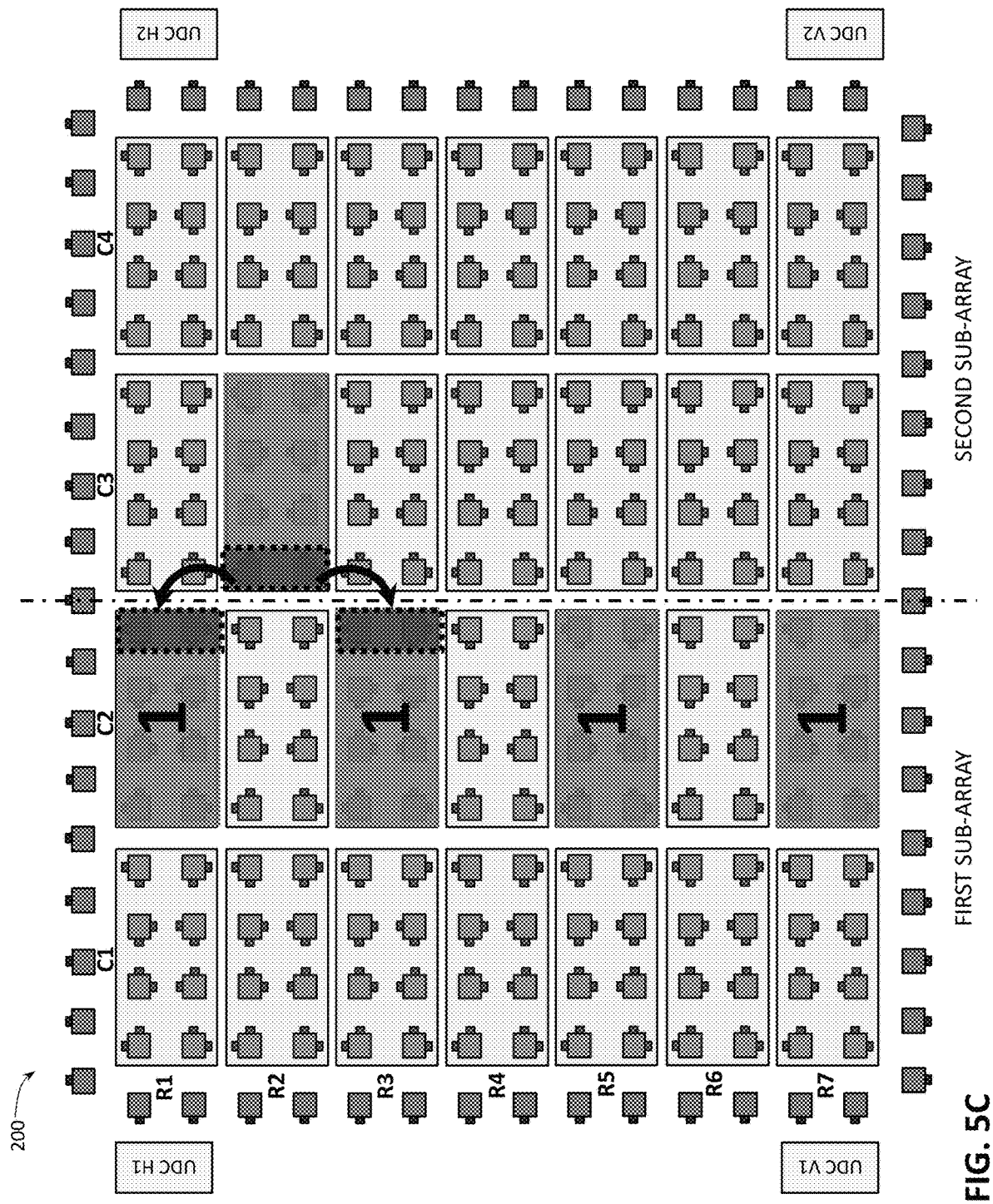

FIG. 5C illustrates that step 1 may further include using the antenna cell R2C3 of the second sub-array as a probe for calibrating the antenna cells R3C2 and R1C2 of the first sub-array with respect to one another. The calibration illustrated in FIG. 5C may be performed analogously to that described for the antenna cells illustrated in FIG. 5A, and, therefore, in the interest of brevity, this description is not repeated. Because the antenna cell R3C2 was previously calibrated with respect to the antenna cells R5C2 and R7C2, as a result of calibrating the antenna cell R3C2 now with respect to the antenna cell R1C2, all four of the antenna cells R1C2, R3C2, R5C2, and R7C2 are calibrated with respect to one another, as indicated in FIG. 5C with the number "1" shown over each of these antenna cells. At this point, every other antenna cell of column C2 of the first sub-array (e.g., the antenna cell of every odd row of column C2 of the first sub-array for the example shown in FIGS. 5A-5C) has been calibrated with respect to one another and the calibration process may proceed to similarly calibrating the remaining antenna cells of column C2 (e.g., the antenna cell of every even row of column C2 of the first sub-array), which process may start as shown in FIG. 5D.

Figure 5D:
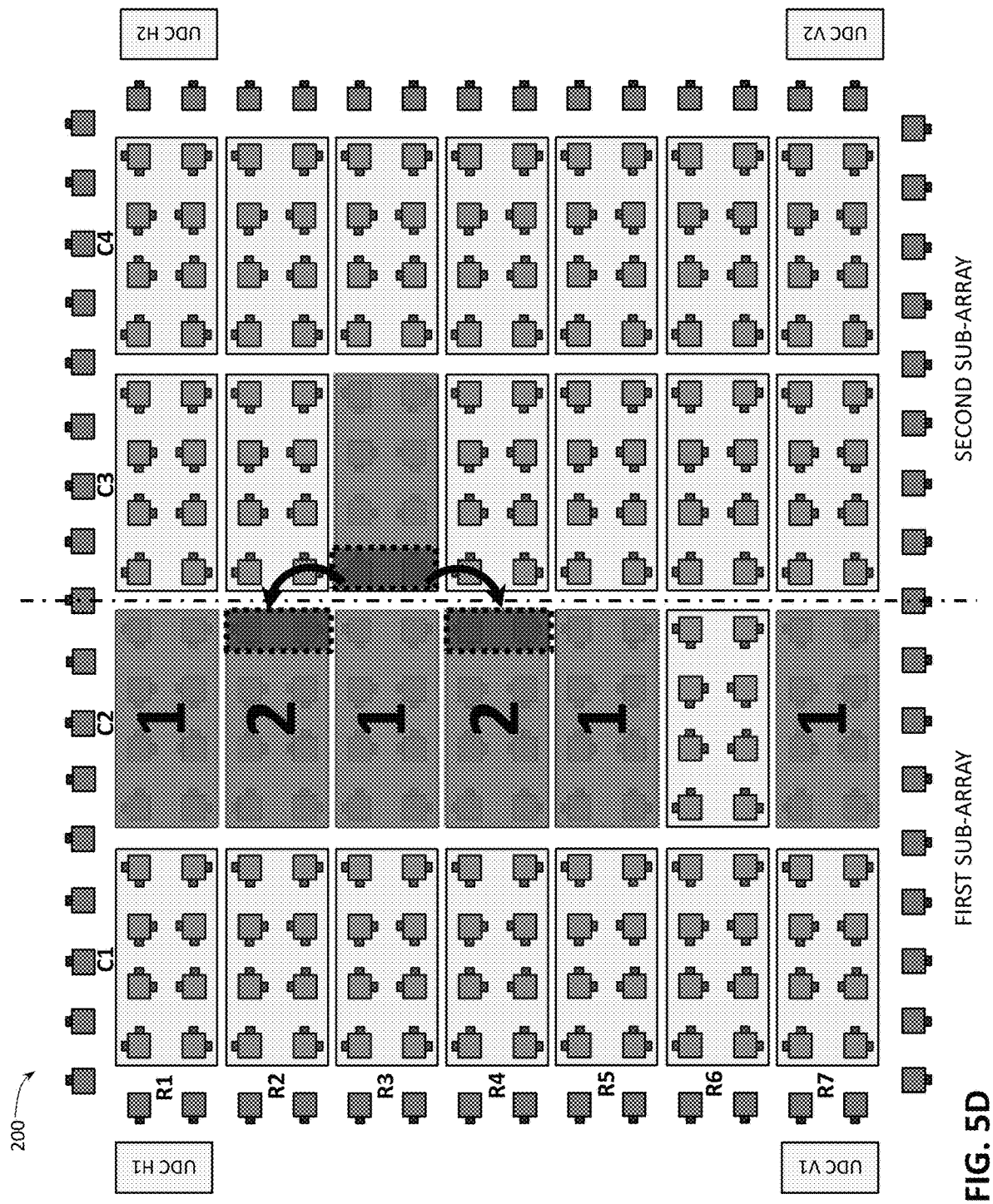

FIG. 5D illustrates that step 1 may include using the antenna cell R3C3 of the second sub-array as a probe for calibrating the antenna cells R2C2 and R4C2 of the first sub-array with respect to one another. The calibration illustrated in FIG. 5D may be performed analogously to that described for the antenna cells illustrated in FIG. 5A, and, therefore, in the interest of brevity, this description is not repeated. However, because this calibration does not include any of the probes or the target cells calibrated before and having been placed into a calibration state "1", as a result of calibrating the antenna cell R2C2 with respect to the antenna cell R4C2, two of these antenna cells are calibrated with respect to one another to a different calibration state, as indicated in FIG. 5B with the number "2" shown over each of the antenna cells R2C2 and R4C2.

Figure 5E:
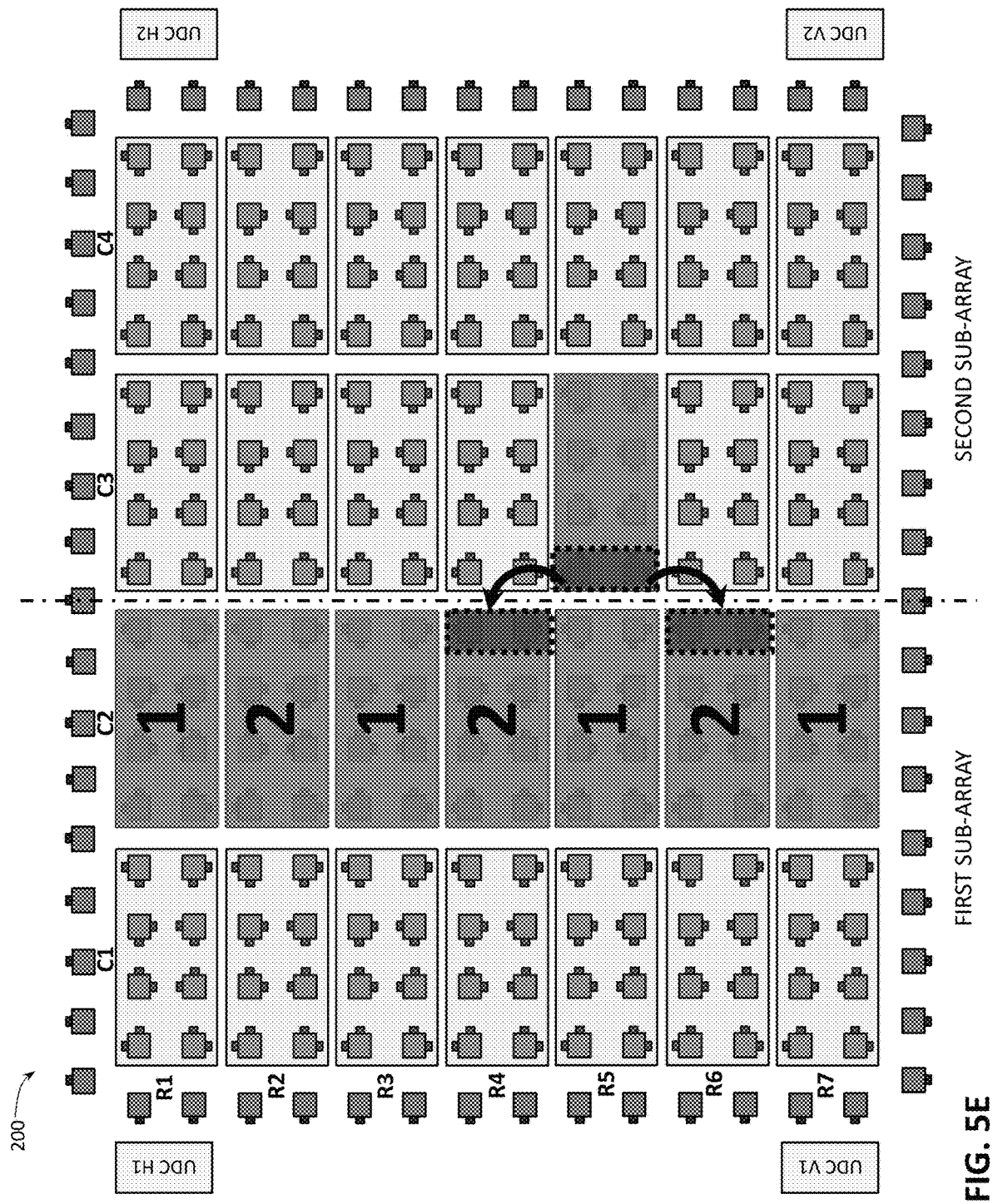

FIG. 5E illustrates that step 1 may further include using the antenna cell R5C3 of the second sub-array as a probe for calibrating the antenna cells R4C2 and R6C2 of the first sub-array with respect to one another. The calibration illustrated in FIG. 5E may be performed analogously to that described for the antenna cells illustrated in FIG. 5D, and, therefore, in the interest of brevity, this description is not repeated. Because the antenna cell R4C2 was previously calibrated with respect to the antenna cell R2C2, as a result of calibrating the antenna cell R4C2 now with respect to the antenna cell R6C2, all three of the antenna cells R2C2, R4C2, and R6C2 are calibrated with respect to one another, as indicated in FIG. 5E with the number "2" shown over each of these antenna cells. At this point, the antenna cells of the odd rows of column C2 of the first sub-array have been calibrated with respect to one another, achieving one calibration state between these antenna cells (denoted in FIG. 5E by the number "1) and the antenna cells of the even rows of column C2 of the first sub-array have been calibrated with respect to one another, achieving another single calibration state between these antenna cells (denoted in FIG. 5E by the number "2"). Now the antenna cells of odd and even rows of column C2 need to be calibrated with respect to one another, which process may start as shown in FIG. 5F.

Figure 5F:
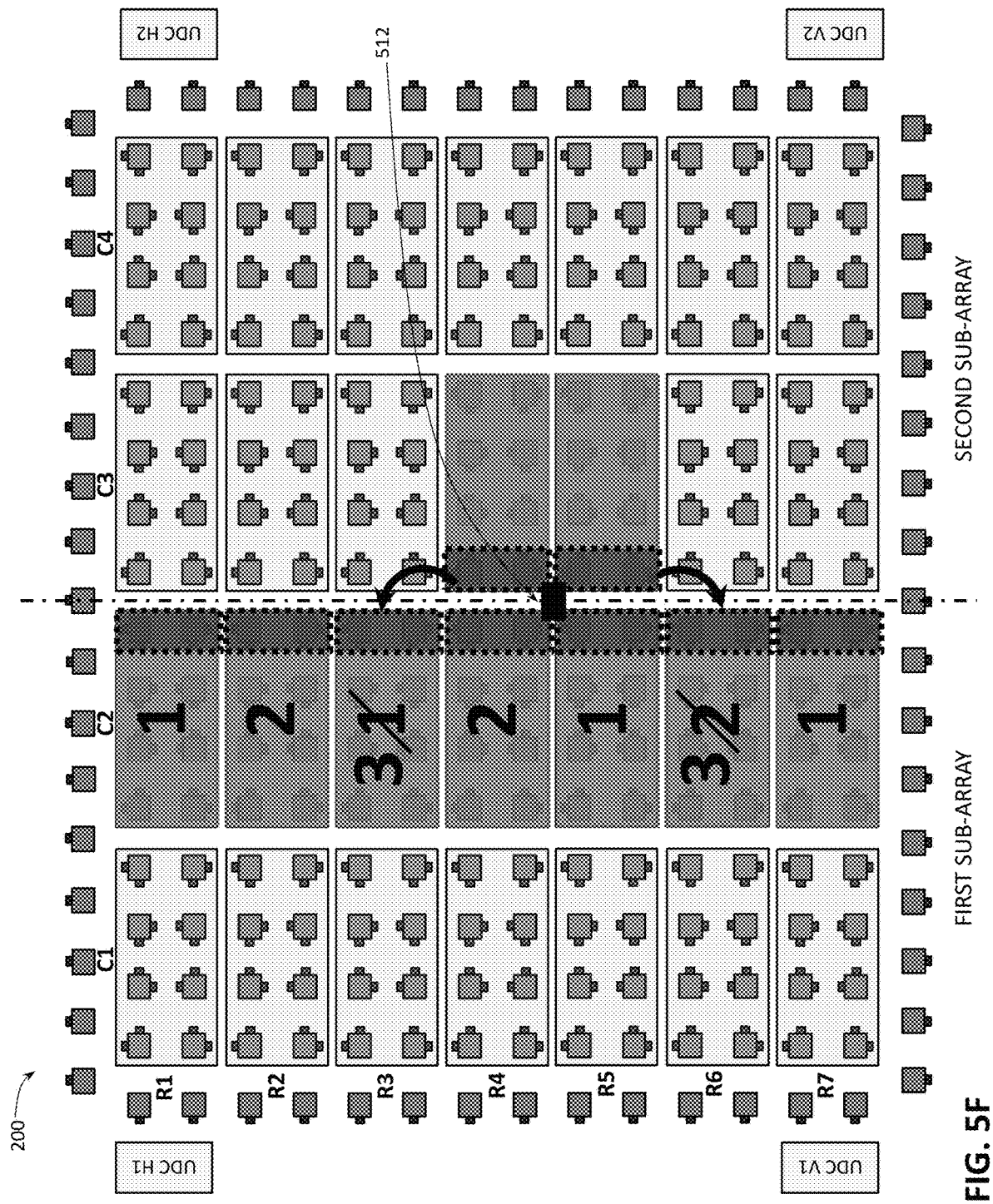

FIG. 5F illustrates that step 1 may then include using not one but two antenna cells of the second sub-array, e.g., the antenna cells R4C3 and R5C3, as a probe for calibrating the antenna cells R3C2 (i.e., the antenna cell of the odd row) and R6C2 (i.e., the antenna cell of the even row) of the first sub-array with respect to one another. The calibration illustrated in FIG. 5E may be performed analogously to that described above except that instead of the probe transmitting/receiving signals with the antenna elements of one probe antenna cell, the probe is transmitting/receiving signals with the antenna elements of two probe antenna cells (e.g., the 4 antenna cells within the dotted contours shown in the second sub-array of FIG. 5F). Therefore, in the interest of brevity, this description is not repeated. As a result of performing this calibration, antenna cells R3C2 and R6C2 are calibrated with respect to one another, as indicated in FIG. 5F with their states "1" and "2", respectively, being replaced with "3" shown over each of these antenna cells, indicating that these two antenna cells may be calibrated to be in the same state which may, in general, be different from the states "1" and "2" (however, in some embodiments, state "3" may be equal to state "1" or to state "2").

It should be noted that, while not specifically shown in a separate drawing, before two antenna cells of the second sub-array may be used as a probe as shown in FIG. 5F, these two antenna cells may be calibrated with respect to one another, i.e., the antenna cells R4C3 and R5C3 may first be calibrated with respect to one another. To that end, an additional probe 512 (shown in FIG. 5F as a black rectangle) may be used, placed symmetrically to these cells. A calibration for H- and V-polarizations may then be performed with the additional probe 512 being used to calibrate the target cells R4C3 and R5C3 with respect to one another in a manner similar to the calibration described with reference to FIG. 5A. In some embodiments of such calibration, the additional probe 512 may be configured to be coupled to the UDC H1 for the H-polarization calibration of the target antenna cells R4C3 and R5C3 (which target antenna cells are then sequentially coupled to the UDC H2). In some embodiments of such calibration, the additional probe 512 may be configured to be coupled to the UDC V1 for the V-polarization calibration of the target antenna cells R4C3 and R5C3 (which target antenna cells are then sequentially coupled to the UDC V2). In other embodiments, additional UDC circuits (not specifically shown in FIG. 5F) may be used for coupling to the additional probe 512.

Figure 5G:
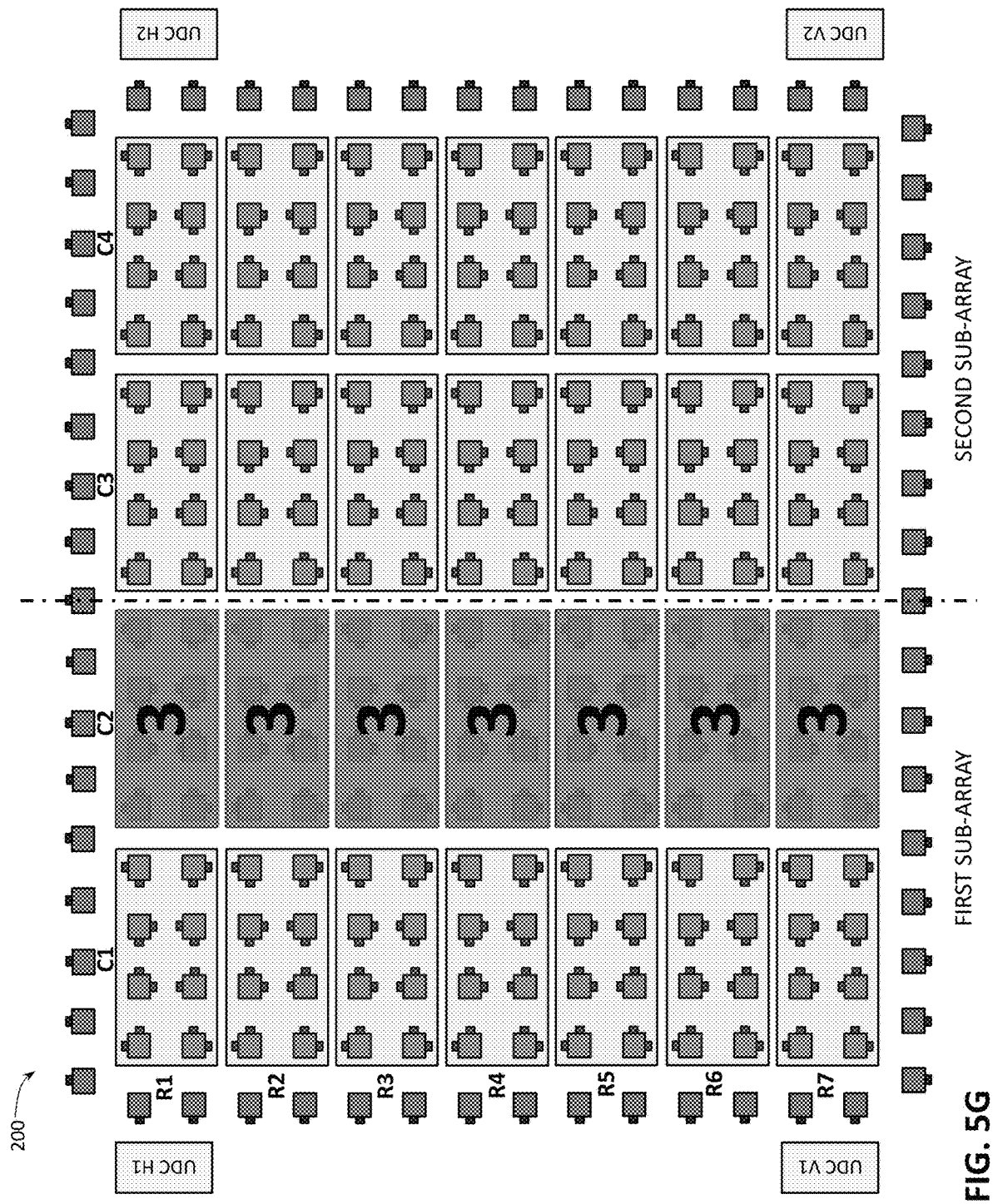

Once the antenna cells R3C2 and R6C2 have been calibrated with respect to one another, other antenna cells which have previously been calibrated with respect to one of these two cells may be set to be in the same calibration state. A result of this is illustrated in FIG. 5G, showing that now all antenna cells of column C2 of the first sub-array have been calibrated with respect to one another.

Figure 5H:
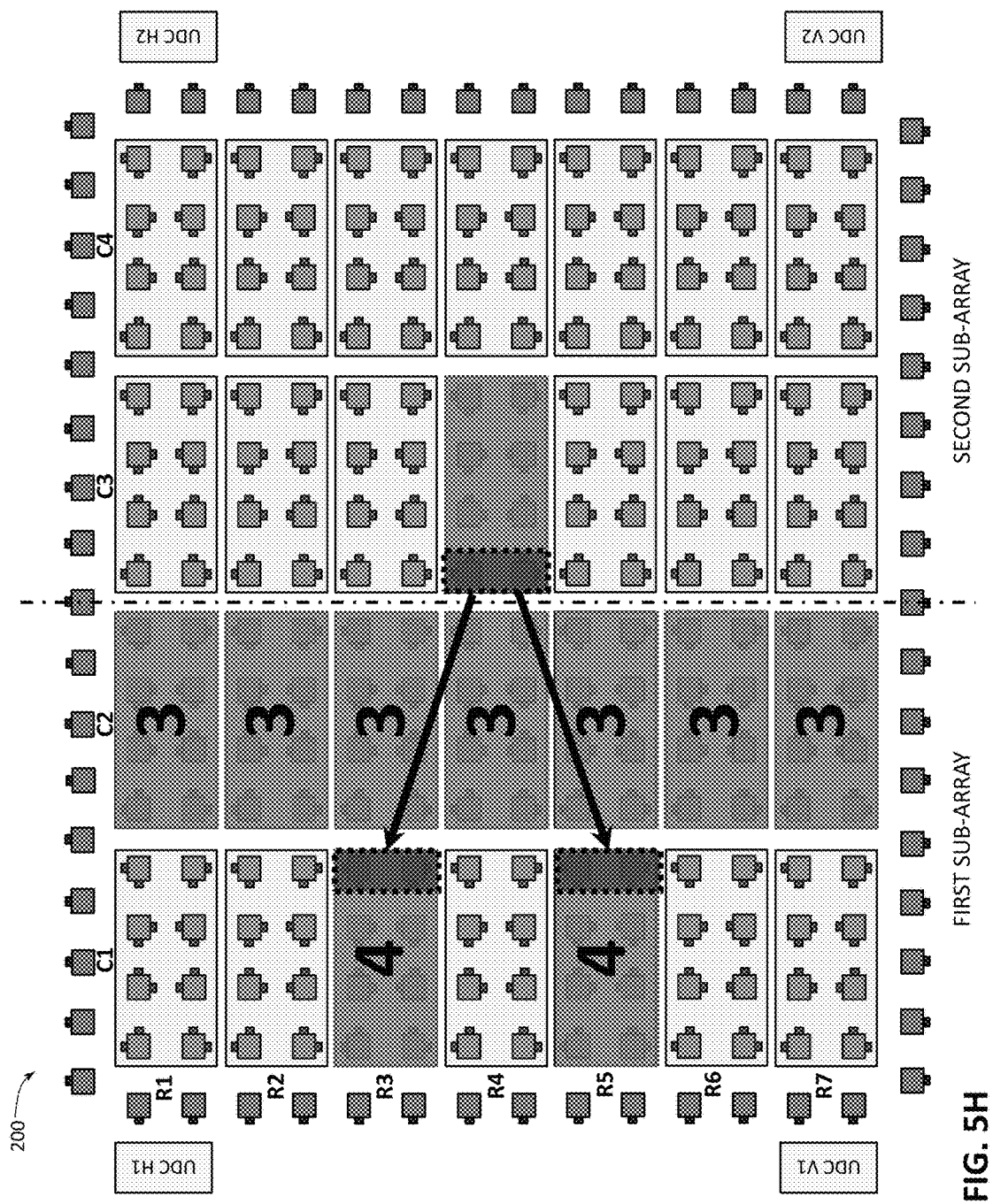
Figure 51:
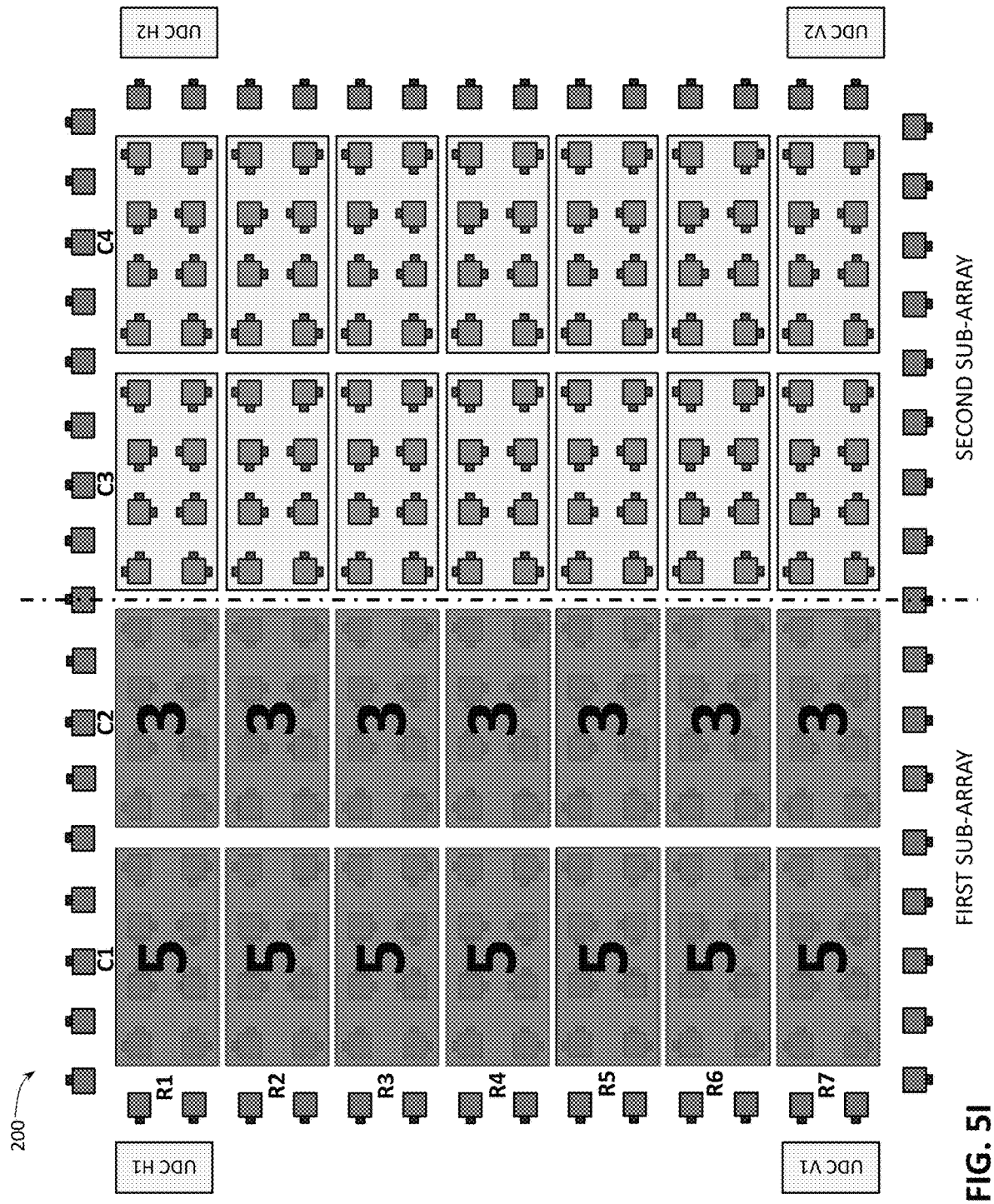

Step 1 of the method 400 may then proceed with calibrating antenna cells 210 of another column of the first sub-array with respect to one another. To that end, the antenna cell R4C3 may be used as a probe to calibrate antenna cells R3C1 and R5C1 with respect to one another, as shown in FIG. 5H. The calibration illustrated in FIG. 5H may be performed analogously to that described for the antenna cells illustrated in FIG. 5A, and, therefore, in the interest of brevity, this description is not repeated. As a result of this calibration, the antenna cells R3C1 and R5C1 are calibrated with respect to one another, as indicated in FIG. 5H with the number "4" shown over each of these antenna cells.

Step 1 of the method 400 may then proceed with calibrating all of the antenna cells of column C1 with respect to one another, e.g., similar to how it was described for the calibration of the antenna cells of column C2 and shown in FIGS. 5A-5G (which descriptions and drawings are not repeated here individually in the interest of brevity). As a result of this calibration, all antenna cells of column C1 may be set to be in the same calibration state. A result of this is illustrated in FIG. 5I, showing that now all antenna cells of column C1 of the first sub-array have been calibrated with respect to one another and are all in a calibration state "5" (in some embodiments, state "5" may be equal to state "4" shown in FIG. 5H).

Step 1 may continue until each column of the antenna cells 210 of the first sub-array is individually calibrated as described above. Once that is done, a calibration between the different columns of the antenna cells 210 of the first sub-array may be performed. The method 400 may then continue with step 2, which includes calibrating antenna elements of different columns of the antenna cells 210 of the first sub-array with respect to one another. In other words, step 2 includes calibrating different columns of the antenna cells 210 of the first sub-array with respect to one another.

Figure 6B:
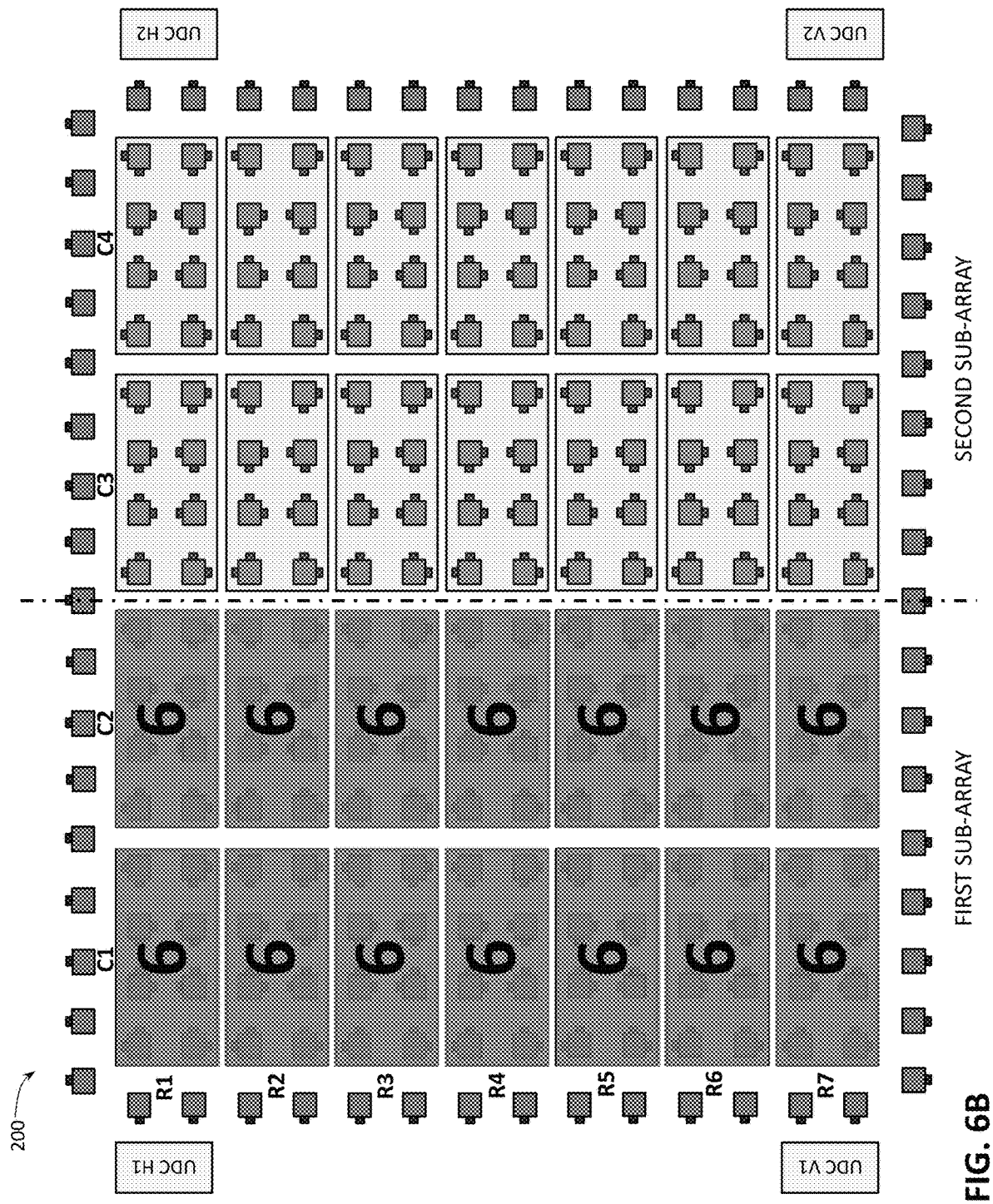

FIGS. 6A-6B provide schematic illustrations of different states of performing step 2 of the calibration method 400 for the antenna apparatus 200 of FIG. 2, according to some embodiments of the present disclosure.

Turning to FIG. 6A, step 2 may include using an additional calibration probe that is symmetric to two target antenna cells of different columns of the antenna cells of the first sub-array in order to calibrate these target antenna cells. For example, a calibration probe 212-1 shown in FIG. 6A is symmetric to the antenna cells R1C1 and R1C2 and may, therefore, be used to calibrate these target antenna cells. A calibration for H- and V-polarizations may then be performed with the calibration probe 212-1 being used to calibrate the target cells R1C1 and R1C2 with respect to one another in a manner similar to the calibration described with reference to FIG. 5A. In some embodiments of such calibration, the calibration probe 212-1 may be configured to be coupled to the UDC H2 for the H-polarization calibration of the target antenna cells R1C1 and R1C2 (which target antenna cells are then sequentially coupled to the UDC H1). In some embodiments of such calibration, the calibration probe 212-1 may be configured to be coupled to the UDC V2 for the V-polarization calibration of the target antenna cells R1C1 and R1C2 (which target antenna cells are then sequentially coupled to the UDC V1). In other embodiments, additional UDC circuits (not specifically shown in FIG. 6A) may be used for coupling to the calibration probe 212-1. As a result of performing this calibration, antenna cells R1C1 and R1C2 are calibrated with respect to one another, as indicated in FIG. 6A with their states "5" and "3", respectively, being replaced with "6" shown over each of these antenna cells, indicating that these two antenna cells may be calibrated to be in the same state which may, in general, be different from the states "5" and "3" (however, in some embodiments, state "6" may be equal to state "5" or to state "3").

Once the antenna cells R1C1 and R1C2 have been calibrated with respect to one another, other antenna cells which have previously been calibrated with respect to one of these two cells may be set to be in the same calibration state. A result of this is illustrated in FIG. 6B, showing that now all antenna cells of columns C1 and C2 of the first sub-array have been calibrated with respect to one another, all assuming the same state "6."

The method 400 may further include step 3, which includes, for each column of the antenna cells 210 of the second sub-array, calibrating the antenna elements 112 of the column with respect to one another. In other words, step 3 includes individually calibrating each column of antenna cells 210 of the second sub-array. FIGS. 7A-7D provide schematic illustrations of different states of performing step 3 of the calibration method 400 for the antenna apparatus 200 of FIG. 2, according to some embodiments of the present disclosure. Step 3 may be seen substantially analogous to step 1, except that the first and second sub-arrays are reversed (i.e., instead of calibrating individual columns of the antenna cells 210 of the first sub-array using some antenna cells 210 of the second sub-array as probes, as was done in step 1, step 3 includes calibrating individual columns of the antenna cells 210 of the second sub-array using some antenna cells 210 of the first sub-array as probes).

As shown in FIG. 7A, step 3 may include using the antenna cell R4C2 as a probe to calibrate antenna cells R3C3 and R5C3 with respect to one another. The calibration illustrated in FIG. 7A may be performed analogously to that described for the antenna cells illustrated in FIG. 5A, and, therefore, in the interest of brevity, this description is not repeated. As a result of this calibration, the antenna cells R3C3 and R5C3 are calibrated with respect to one another, as indicated in FIG. 7A with the number "7" shown over each of these antenna cells.

Figure 7B:
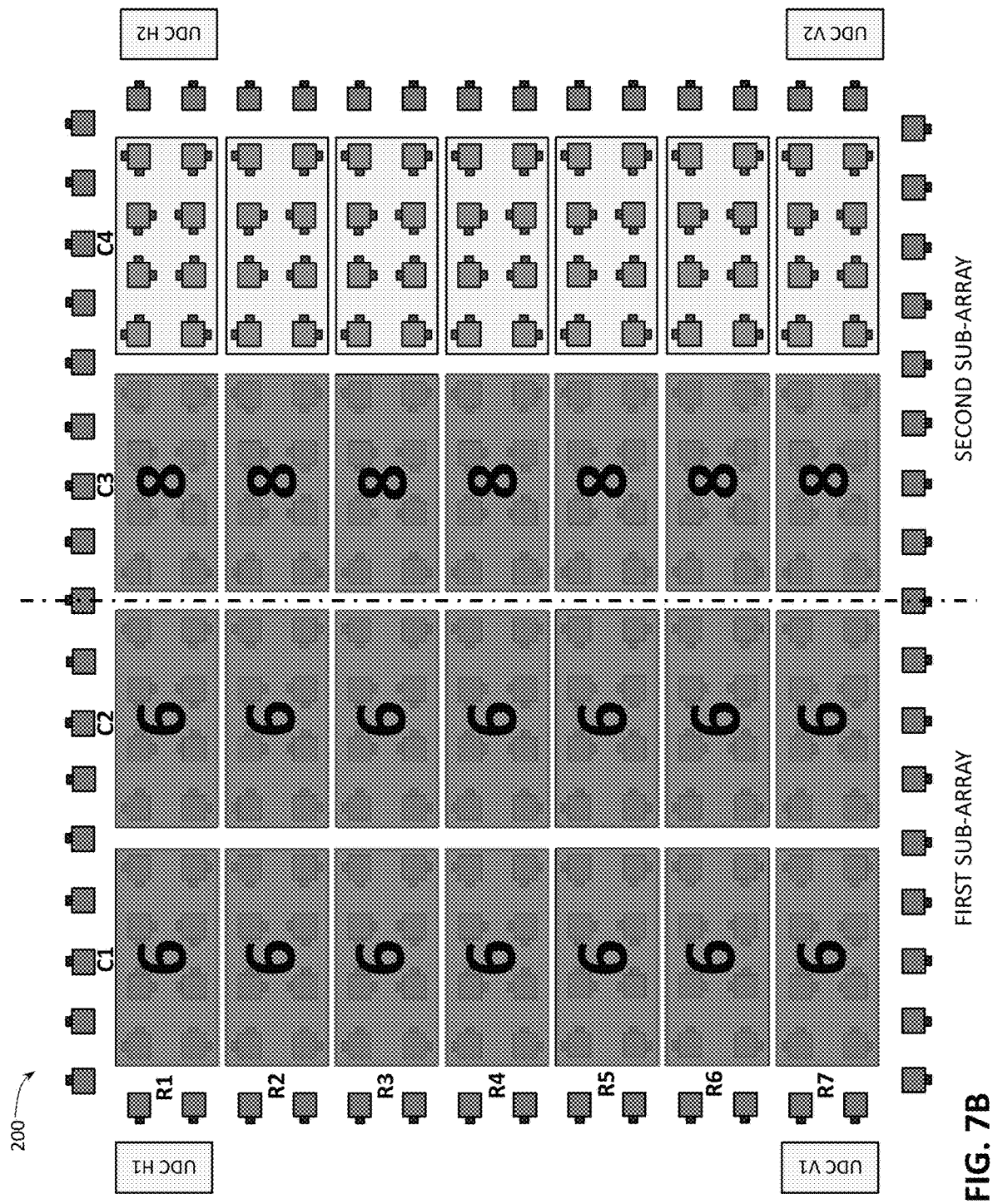

Step 3 of the method 400 may then proceed with calibrating all of the antenna cells of column C3 with respect to one another, e.g., similar to how it was described for the calibration of the antenna cells of column C2 and shown in FIGS. 5A-5G (which descriptions and drawings are not repeated here individually in the interest of brevity). One difference with respect to step 1 is that, in calibrating all of the antenna cells of column C3 with respect to one another in step 3, there is no need to use the additional probe in the center of the antenna array as was described with reference to FIG. 5F because the antenna cells of the first sub-array have already been calibrated with respect to one another. As a result of this calibration, all antenna cells of column C3 may be set to be in the same calibration state. A result of this is illustrated in FIG. 7B, showing that now all antenna cells of column C3 of the second sub-array have been calibrated with respect to one another and are all in a calibration state "8" (in some embodiments, state "8" may be equal to state "7" shown in FIG. 7B).

Figure 7C:
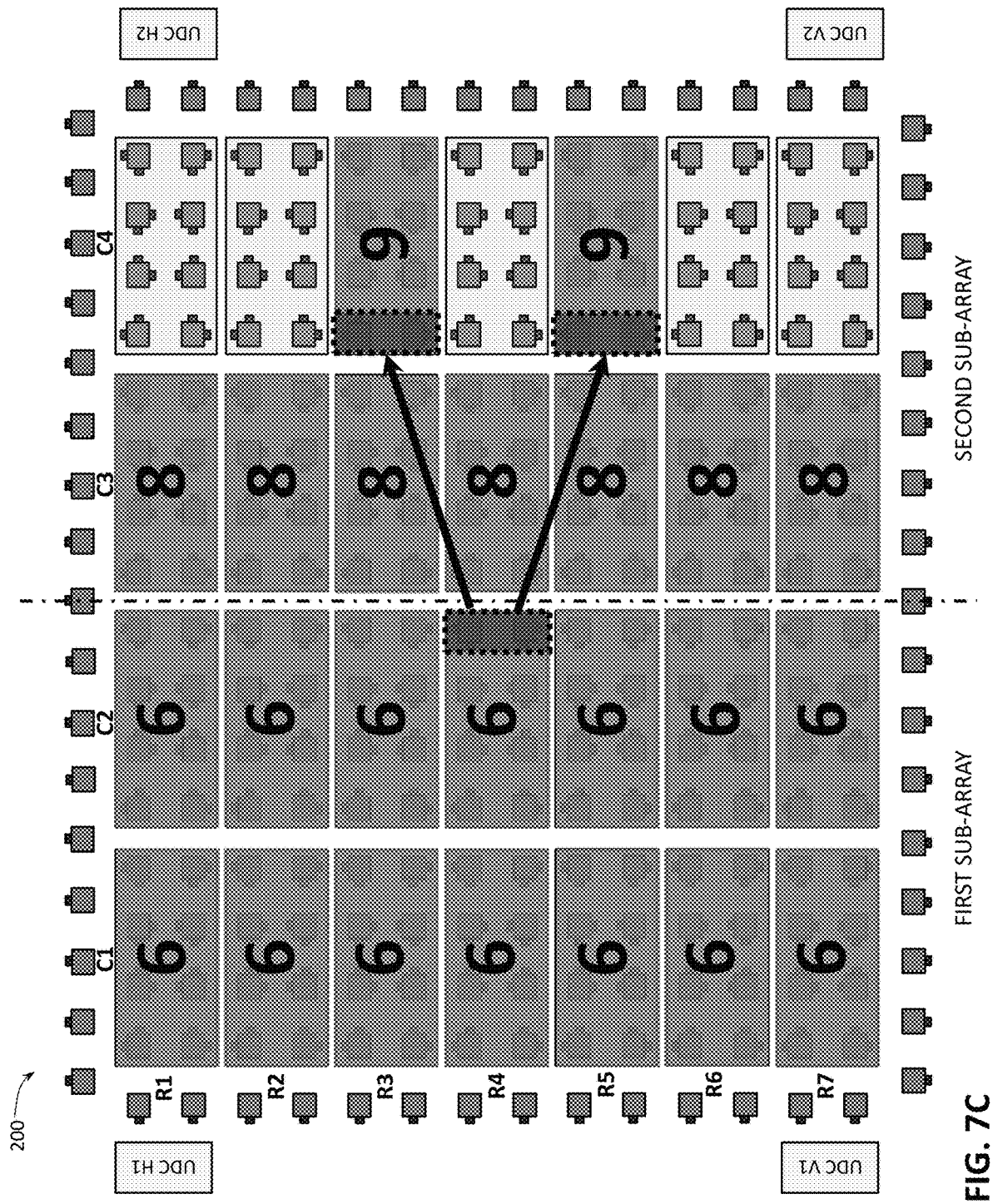

Step 3 may then include calibrating antenna cells 210 of another column of the second sub-array with respect to one another. As a part of that, the antenna cell R4C2 may be used as a probe to calibrate antenna cells R3C4 and R5C4 with respect to one another, as shown in FIG. 7C. The calibration illustrated in FIG. 7C may be performed analogously to that described for the antenna cells illustrated in FIG. 5A, and, therefore, in the interest of brevity, this description is not repeated. As a result of this calibration, the antenna cells R3C4 and R5C4 are calibrated with respect to one another, as indicated in FIG. 7C with the number "9" shown over each of these antenna cells.

Figure 7D:
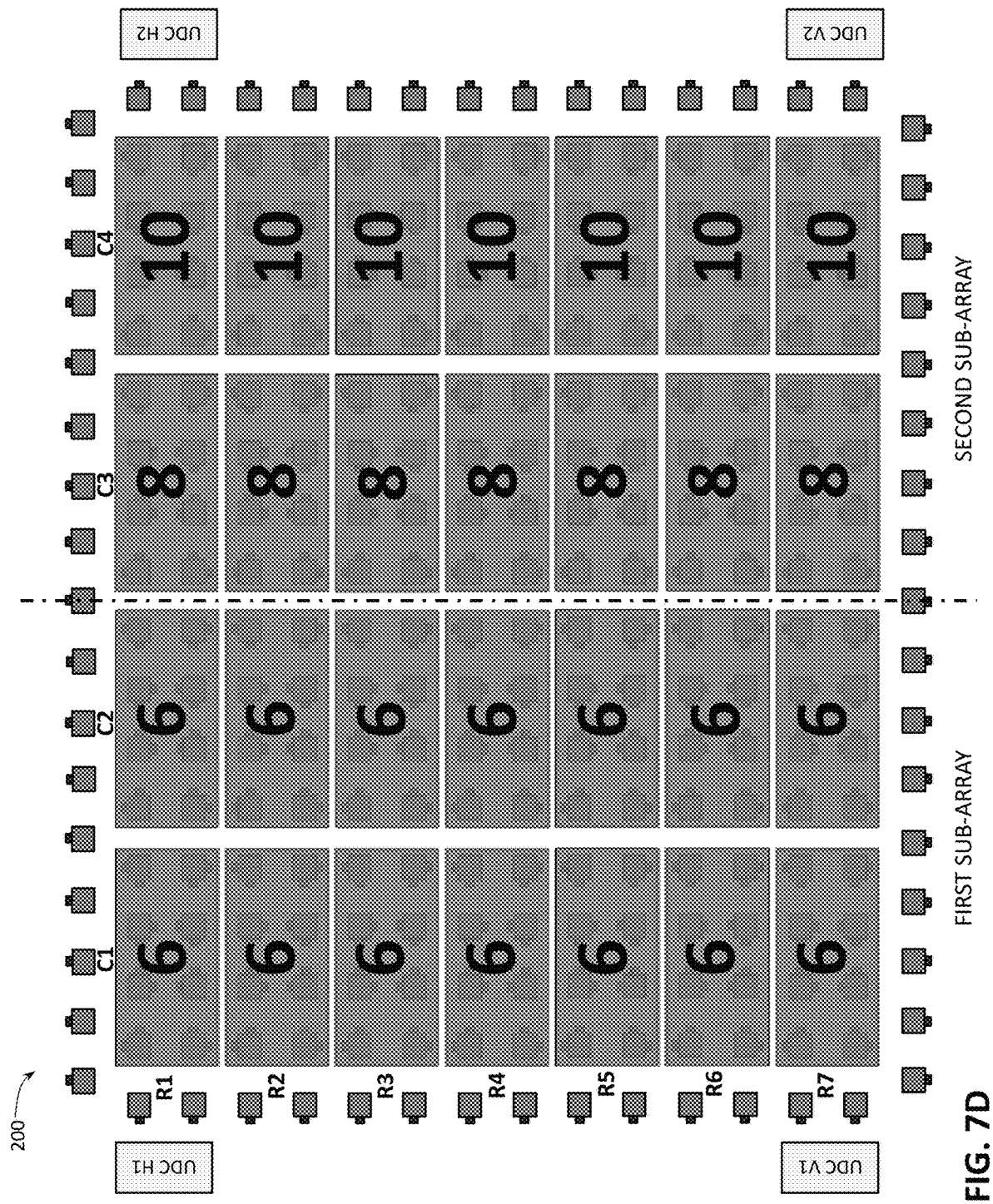

Step 3 of the method 400 may then proceed with calibrating all of the antenna cells of column C4 with respect to one another, e.g., similar to how it was described for the calibration of the antenna cells of column C1 (which descriptions and drawings are not repeated here individually in the interest of brevity). As a result of this calibration, all antenna cells of column C4 may be set to be in the same calibration state. A result of this is illustrated in FIG. 7D, showing that now all antenna cells of column C4 of the second sub-array have been calibrated with respect to one another and are all in a calibration state "10" (in some embodiments, state "10" may be equal to state "9" shown in FIG. 7C).

Step 3 may continue until each column of the antenna cells 210 of the second sub-array is individually calibrated as described above. Once that is done, a calibration between the different columns of the antenna cells 210 of the second sub-array may be performed. The method 400 may then continue with step 4, which includes calibrating antenna elements of different columns of the antenna cells 210 of the second sub-array with respect to one another. In other words, step 4 includes calibrating different columns of the antenna cells 210 of the second sub-array with respect to one another.

Figure 8A:
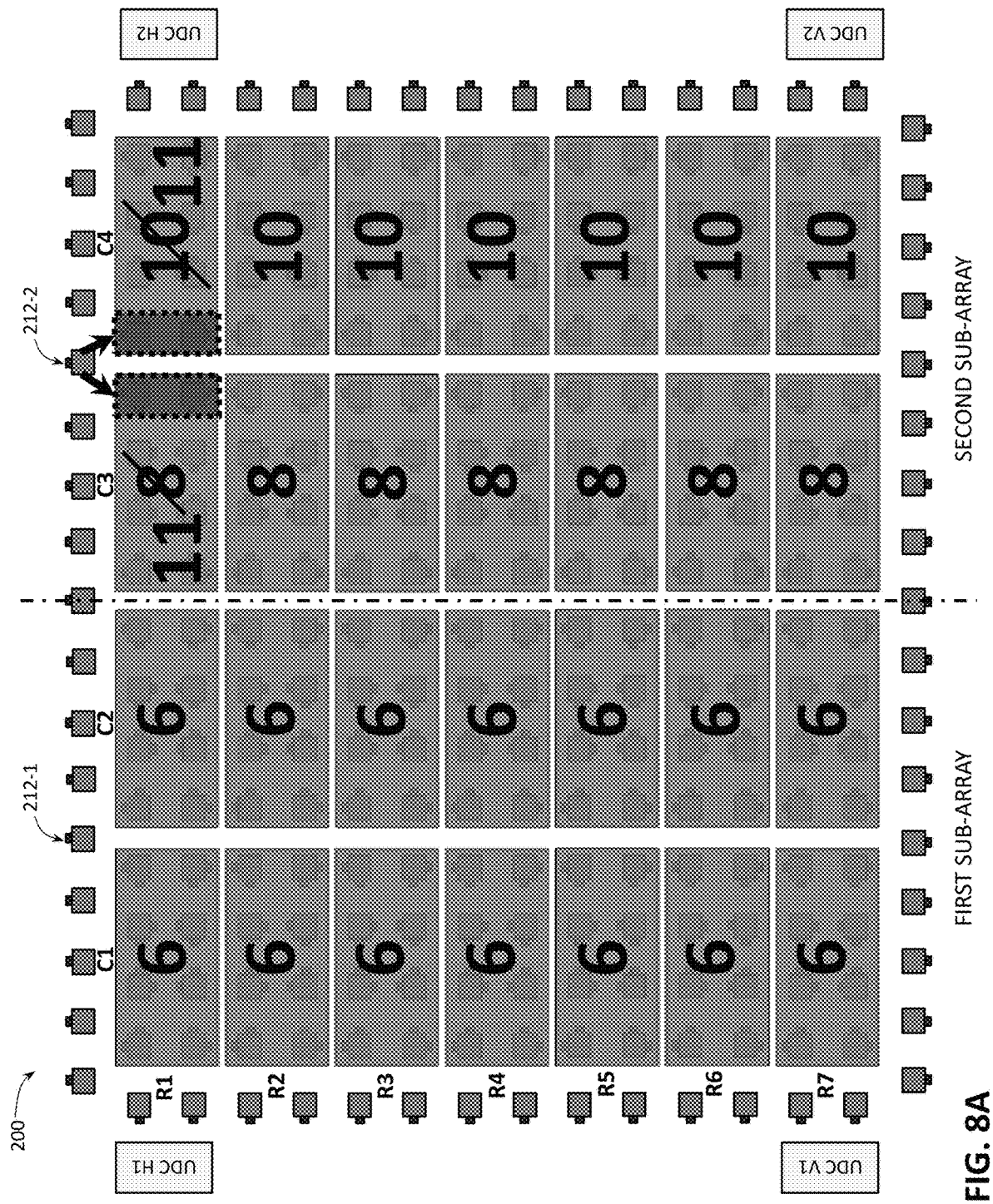
FIGS. 8A-8B provide schematic illustrations of different states of performing step 4 of the calibration method of FIG. 4 for the antenna apparatus of FIG. 2, according to some embodiments of the present disclosure.
Figure 8B:
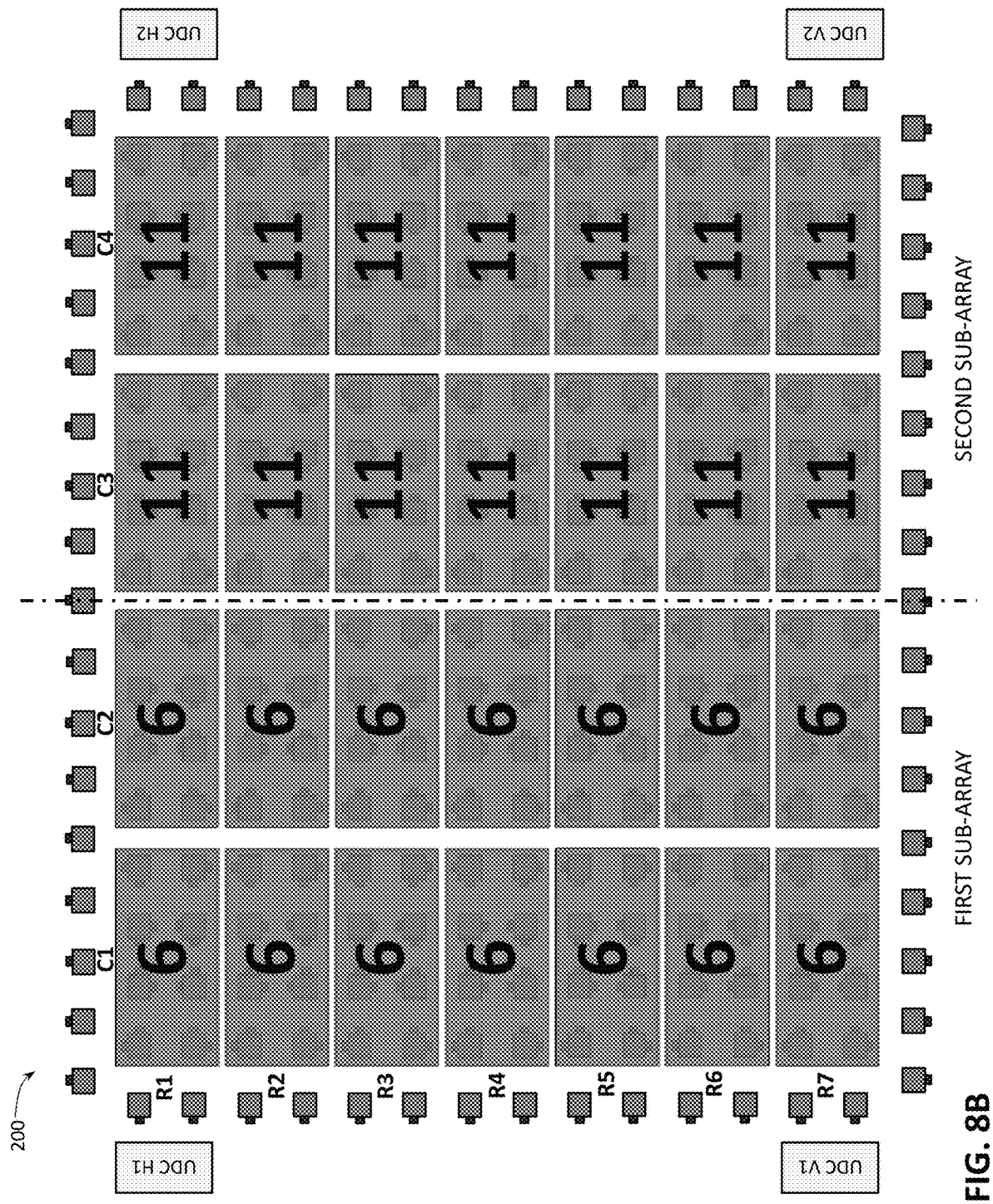

Step 4 may be seen substantially analogous to step 2, except that, instead of calibrating the antenna cells 210 of different columns of the first sub-array, as was done in step 2, in step 4 it is the antenna cells 210 of different columns of the second sub-array that are being calibrated. FIGS. 8A-8B provide schematic illustrations of different states of performing step 4 of the calibration method 400 for the antenna apparatus 200 of FIG. 2, according to some embodiments of the present disclosure.

As shown in FIG. 8A, step 4 may include using an additional calibration probe that is symmetric to two target antenna cells of different columns of the antenna cells of the second sub-array in order to calibrate these target antenna cells. For example, a calibration probe 212-2 shown in FIG. 8A is symmetric to the antenna cells R1C3 and R1C4 and may, therefore, be used to calibrate these target antenna cells. A calibration for H- and V-polarizations may then be performed with the calibration probe 212-2 being used to calibrate the target cells R1C3 and R1C4 with respect to one another in a manner similar to the calibration described with reference to FIG. 6A. In some embodiments of such calibration, the calibration probe 212-2 may be configured to be coupled to the UDC H1 for the H-polarization calibration of the target antenna cells R1C3 and R1C4 (which target antenna cells are then sequentially coupled to the UDC H2).

In some embodiments of such calibration, the calibration probe 212-2 may be configured to be coupled to the UDC V1 for the V-polarization calibration of the target antenna cells R1C3 and R1C4 (which target antenna cells are then sequentially coupled to the UDC V2). In other embodiments, additional UDC circuits (not specifically shown in FIG. 8A) may be used for coupling to the calibration probe 212-2. As a result of performing this calibration, antenna cells R1C3 and R1C4 are calibrated with respect to one another, as indicated in FIG. 8A with their states "8" and "10", respectively, being replaced with "11" shown over each of these antenna cells, indicating that these two antenna cells may be calibrated to be in the same state which may, in general, be different from the states "8" and "10" (however, in some embodiments, state "11" may be equal to state "8" or to state "10").

Once the antenna cells R1C3 and R1C4 have been calibrated with respect to one another, other antenna cells which have previously been calibrated with respect to one of these two cells may be set to be in the same calibration state. A result of this is illustrated in FIG. 8B, showing that now all antenna cells of columns C3 and C4 of the second sub-array have been calibrated with respect to one another, all assuming the same state "11."

Figure 9B:
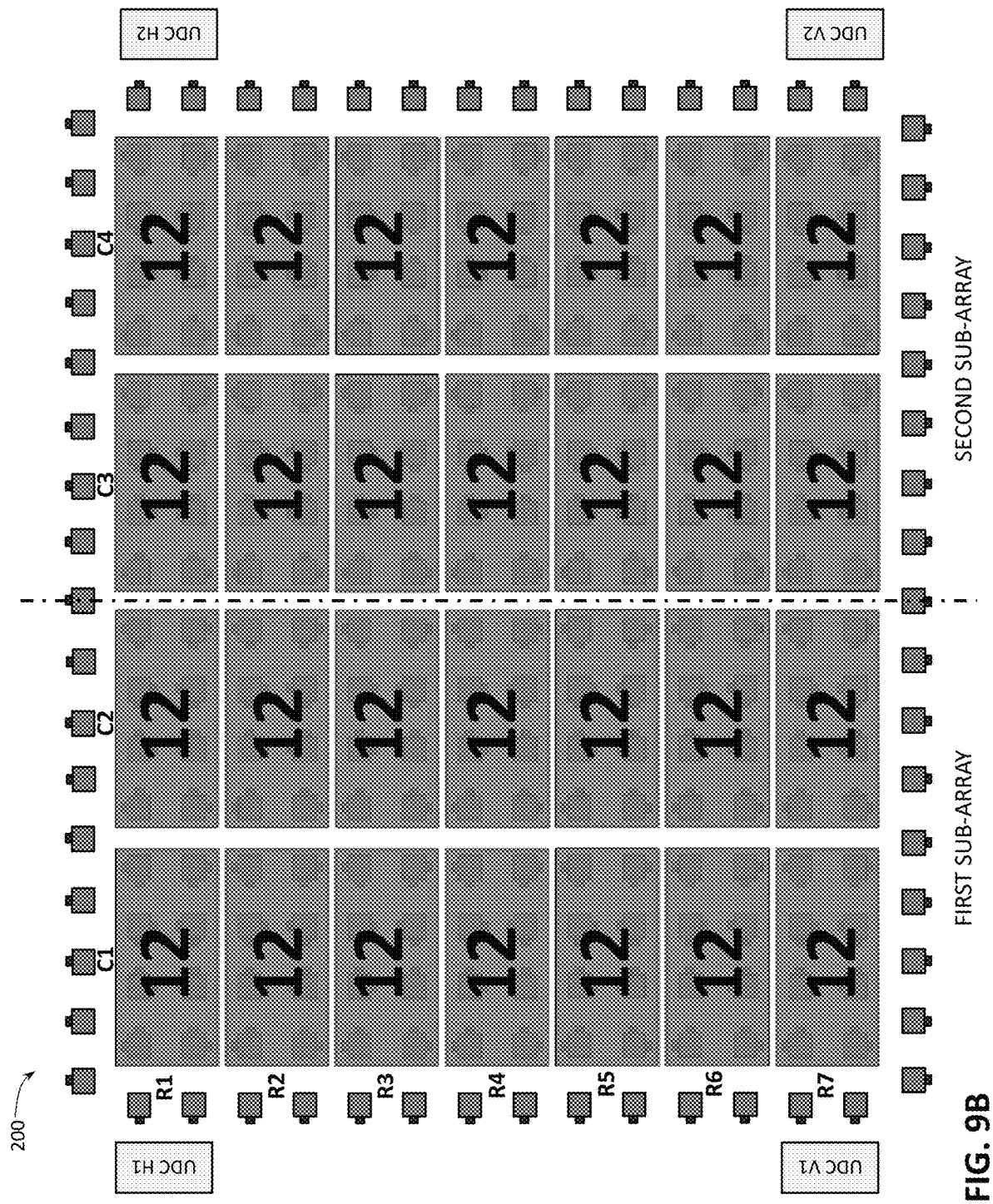

The method 400 may conclude with step 5, which includes calibrating antenna cells 210 of the first sub-array and antenna cells 210 of the second sub-array with respect to one another. In other words, step 5 includes calibrating the antenna elements 112 of the first and second sub-arrays with respect to one another. FIGS. 9A-9B provide schematic illustrations of different states of performing step 5 of the calibration method 400 for the antenna apparatus 200 of FIG. 2, according to some embodiments of the present disclosure.

As shown in FIG. 9A, in the embodiments that may benefit from using the smallest number of UDC circuits, step 5 may include using two additional calibration probes, each of which is symmetric to a different pair of target antenna cells of different sub-arrays in order to calibrate these target antenna cells. For example, a calibration probe 212-3 shown in FIG. 9A is symmetric to the antenna cells R1C2 (of the first sub-array) and R1C3 (of the second sub-array) and may, therefore, be used to calibrate these target antenna cells, while a calibration probe 212-4 shown in FIG. 9A is symmetric to the antenna cells R7C2 (of the first sub-array) and R7C3 (of the second sub-array) and may, therefore, be used to calibrate these target antenna cells.

The reason for using two such additional probes will now be explained. Because step 5 includes calibrating a pair of antenna cells 210 that belong to different sub-arrays, during such calibration performed for one type of polarization, the UDC for that polarization from each sub-array is coupled to the respective target cell. That means that the calibration probe cannot be coupled to the UDC of one of the sub-arrays for the same polarization. Either an additional UDC circuit may then have to be used, or the coupling to the UDC circuits may be implemented as follows. For example, in some embodiments, the calibration probe 213-1 may be used for calibrating the antenna cells R1C2 and R1C3 for H-polarization. In such embodiments, the calibration probe 213-1 may be coupled either to UDC V1 or UDC V2 (there is no preference which one of these two UDCs), and during the calibration for H-polarization, the antenna cells R1C2 and R1C3 are coupled to their respective UDCs for H-polarization (i.e., R1C2 is coupled to UDC H1 and R1C3 is coupled to UDC H2). The H-polarization calibration for these two target antenna cells (i.e., R1C2 and R1C3) does not have to be carried out sequentially as was described for some other scenarios above where both of the target antenna cells would be coupled to the same UDC. On the other hand, the calibration probe 213-2 may be coupled either to UDC H1 or UDC H2 (there is no preference which one of these two UDCs), and during the calibration for V-polarization, the antenna cells R7C2 and R7C3 are coupled to their respective UDCs for V-polarization (i.e., R7C2 is coupled to UDC V1 and R7C3 is coupled to UDC V2). In this case, the V-polarization calibration for these two target antenna cells (i.e., R7C2 and R7C3) does not have to be carried out sequentially as was described for some other scenarios above where both of the target antenna cells would be coupled to the same UDC. In other embodiments, additional UDC circuits (not specifically shown in FIG. 9A) may be used for coupling to the calibration probes 212-3 and/or 212-4. As a result of performing this calibration, antenna cells R1C2 and R1C3 are calibrated with respect to one another for the H-polarization, antenna cells R7C2 and R7C3 are calibrated with respect to one another for the V-polarization and then they may be combined to be calibrated with respect to one another for both polarizations, as indicated in FIG. 9A with their states "6" and "11", respectively, being replaced with "12" shown over each of these antenna cells, indicating that these two antenna cells may be calibrated to be in the same state which may, in general, be different from the states "6" and "11" (however, in some embodiments, state "12" may be equal to state "6" or to state "11").

Once the antenna cells R1C2 and R1C3 have been calibrated with respect to one another, other antenna cells which have previously been calibrated with respect to one of these two cells may be set to be in the same calibration state. A result of this is illustrated in FIG. 9B, showing that now all antenna cells of both the first and the second sub-arrays have been calibrated with respect to one another, all assuming the same state "12."

FIGS. 5-9 provide some illustrations of how the method 400 may be implemented for the example antenna array as shown in FIG. 2. Some variations to the implementation of each of the steps have been described above. However, in further embodiments, additional variations are possible and are within the scope of the present disclosure. For example, while FIG. 5 illustrates first calibrating the antenna cells of column C2 and only then calibrating the antenna cells of the further column C1, in other embodiments, this order may be reversed (this example is for step 1, but the same reasoning holds for step 3). In another example, while FIG. 5 illustrates using as probes the antenna cells of the column of the antenna cells of the second sub-array that is the closest to the first sub-array (i.e., of column C3), this is only done because such an arrangement may be advantageous because the probe is then the closest to the target antenna cells. In other embodiments, antenna cells of other columns of the second sub-array may be used as probes for calibrating the antenna cells 210 of the first sub-array (and vice versa). In yet another example, while the calibration probes 212-1 and 212-2 are illustrated in FIGS. 5-9 as probes from the upper-most row of calibration probes 212, in other embodiments, these calibration probes may be implemented in the lowest row (i.e., the one shown below the antenna array of the antenna apparatus 200, the row that is shown to include the calibration probe 212-4). Other calibration probes 212 illustrated in a row above and in a row below the antenna array of the antenna apparatus 200 may be dummy calibration probes in that they are not actually used for calibration but provided, e.g., for impedance matching purposes. The same applies to the dummy antenna elements 222 shown in FIG. 2.

Figure 10:
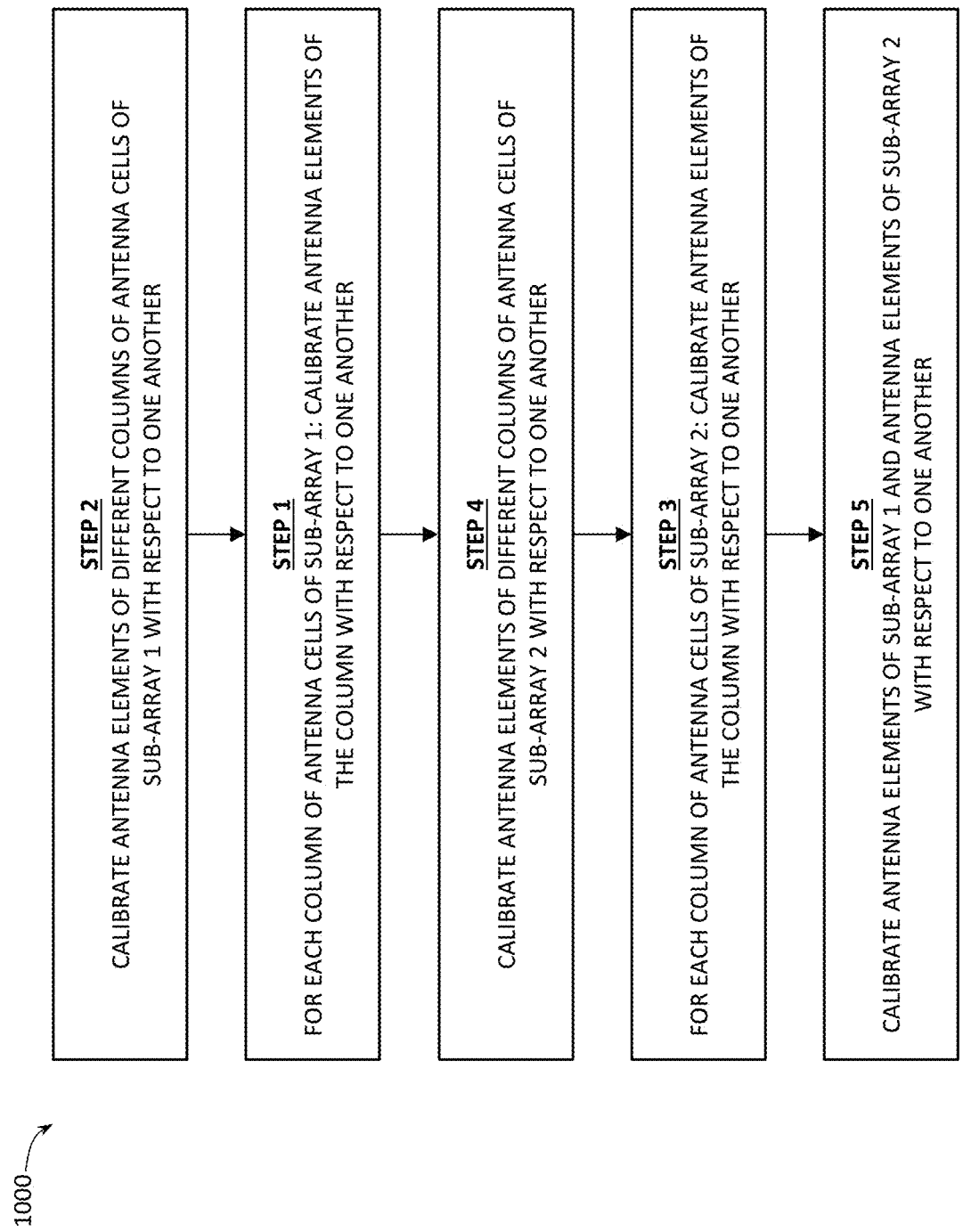
FIGS. 10 and 11 provide block diagrams illustrating alternative methods for performing calibration of an antenna array with dual-polarization antenna elements, according to some embodiments of the present disclosure.
Figure 11:
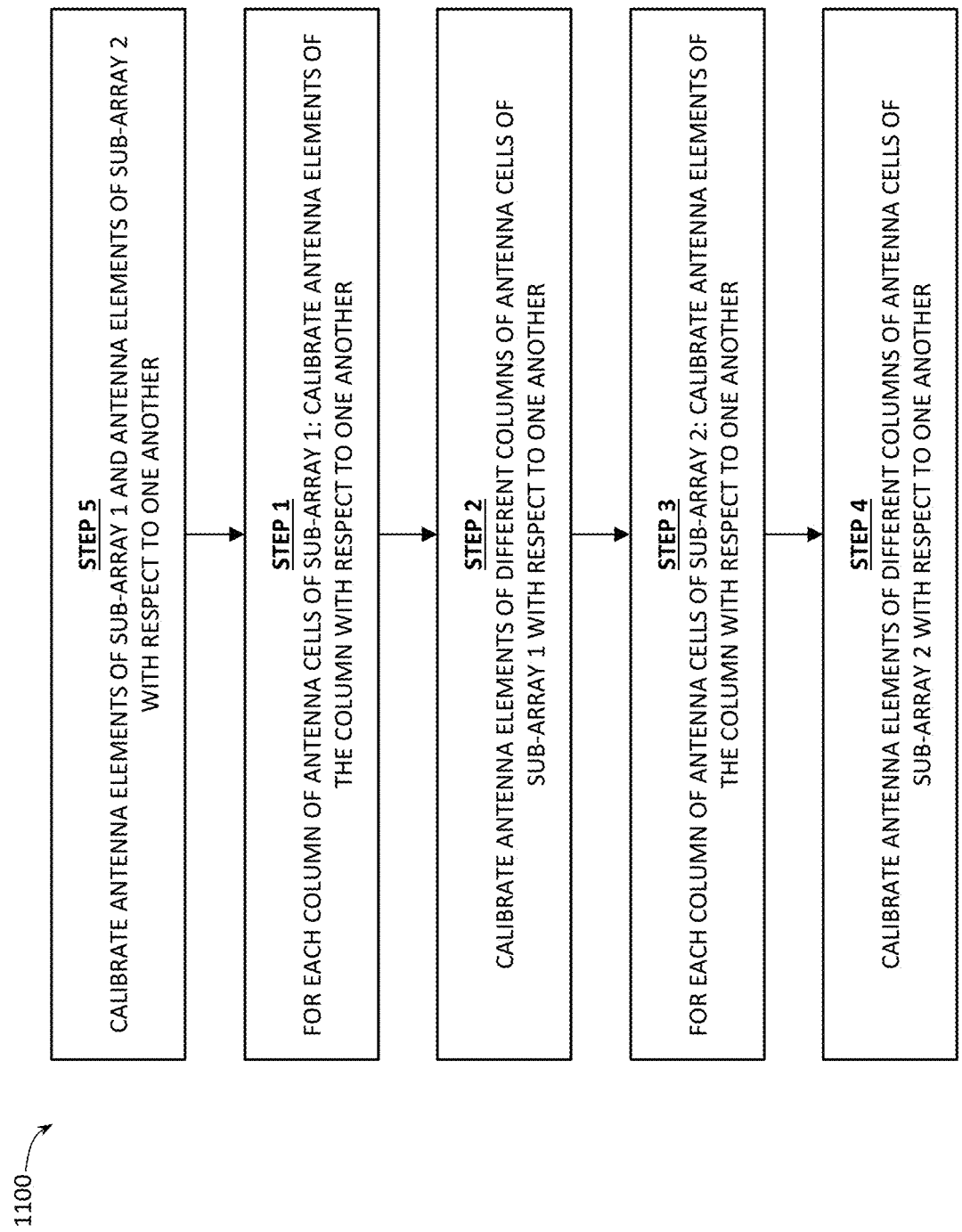

Still further, the order of the steps 1-5 shown in FIG. 4 may be different in different embodiments of the calibration methods for dual-polarization antenna elements 112. FIGS. 10 and 11 provide block diagrams illustrating alternative methods for performing calibration of an antenna array with dual-polarization antenna elements, according to some embodiments of the present disclosure. FIG. 10 illustrates a method 1000 which includes steps 1-5 similar to those of the method 400, except that these steps may be performed in the following order: step 2, then step 1, then step 4, then step 3, and then step 5. Similarly, FIG. 11 illustrates a method 1100 which includes steps 1-5 similar to those of the method 400, except that these steps may be performed in the following order: step 5, then step 1, then step 2, then step 3, and then step 4. A person of ordinary skill in the art would be able to come up with illustrations of the order of the methods 1000 and 1100 similar to those shown in FIGS. 5-9 for the method 400 based on the descriptions provided herein, all of which embodiments being, therefore, within the scope of the present disclosure.

Example Data Processing System

Figure 12:
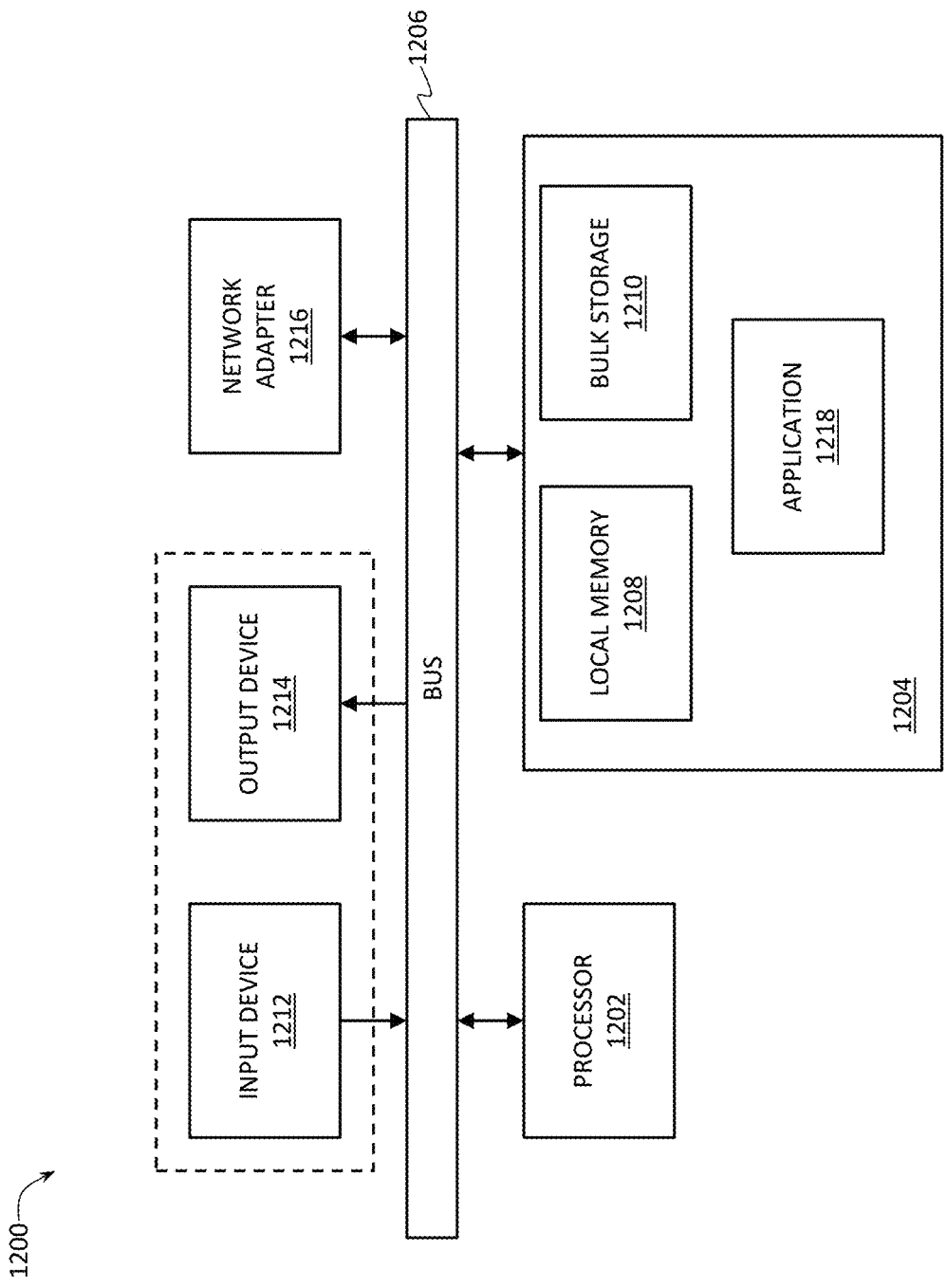
FIG. 12 provides a block diagram illustrating an example data processing system that may be configured to implement, or control, at least portions of performing calibration of antenna arrays with dual-polarization antenna elements, according to some embodiments of the present disclosure.

FIG. 12 provides a block diagram illustrating an example data processing system 1200 that may be configured to implement, or control implementations of, at least portions of systems and methods for performing calibration of antenna arrays with dual-polarization antenna elements as described herein. For example, the data processing system 1200 may include, or be included in, a control processor of a phase antenna array, e.g., the data processing system 1200 may include, or be included in the controller 170, shown in FIG. 1, according to some embodiments of the present disclosure. For example, in some embodiments, any of the antenna elements 112, the beamformers 122, and the UDC circuits 140 may be controlled using such a control processor or a controller implemented as the data processing system 1200.

As shown in FIG. 12, the data processing system 1200 may include at least one processor 1202, e.g. a hardware processor 1202, coupled to memory elements 1204 through a system bus 1206. As such, the data processing system may store program code within memory elements 1204. Further, the processor 1202 may execute the program code accessed from the memory elements 1204 via a system bus 1206. In one aspect, the data processing system may be implemented as a computer that is suitable for storing and/or executing program code. It should be appreciated, however, that the data processing system 1200 may be implemented in the form of any system including a processor and a memory that is capable of performing the functions described within this disclosure, in particular functions related to systems and methods for performing calibration of antenna arrays with dual-polarization antenna elements.

In some embodiments, the processor 1202 can execute software or an algorithm to perform the activities as discussed in this specification, in particular activities related to performing calibration of antenna arrays with dual-polarization antenna elements as described herein. The processor 1202 may include any combination of hardware, software, or firmware providing programmable logic, including by way of non-limiting example a microprocessor, a digital signal processor (DSP), a field-programmable gate array (FPGA), a programmable logic array (PLA), an application specific integrated circuit (ASIC), or a virtual machine processor. The processor 1202 may be communicatively coupled to the memory element 1204, for example in a direct-memory access (DMA) configuration, so that the processor 1202 may read from or write to the memory elements 1204.

In general, the memory elements 1204 may include any suitable volatile or non-volatile memory technology, including double data rate (DDR) random access memory (RAM), synchronous RAM (SRAM), dynamic RAM (DRAM), flash, read-only memory (ROM), optical media, virtual memory regions, magnetic or tape memory, or any other suitable technology. Unless specified otherwise, any of the memory elements discussed herein should be construed as being encompassed within the broad term "memory." The information being measured, processed, tracked or sent to or from any of the components of the data processing system 1200 could be provided in any database, register, control list, cache, or storage structure, all of which can be referenced at any suitable timeframe. Any such storage options may be included within the broad term "memory" as used herein. Similarly, any of the potential processing elements, modules, and machines described herein should be construed as being encompassed within the broad term "processor." Each of the elements shown in the present figures, e.g., any of the circuits/components shown in FIGS. 1-3 and FIGS. 5-9, can also include suitable interfaces for receiving, transmitting, and/or otherwise communicating data or information in a network environment so that they can communicate with, e.g., the data processing system 1200 of another one of these elements.

In certain example implementations, mechanisms for implementing calibration of antenna arrays with dual-polarization antenna elements as outlined herein may be implemented by logic encoded in one or more tangible media, which may be inclusive of non-transitory media, e.g., embedded logic provided in an ASIC, in DSP instructions, software (potentially inclusive of object code and source code) to be executed by a processor, or other similar machine, etc. In some of these instances, memory elements, such as e.g. the memory elements 1204 shown in FIG. 12, can store data or information used for the operations described herein. This includes the memory elements being able to store software, logic, code, or processor instructions that are executed to carry out the activities described herein. A processor can execute any type of instructions associated with the data or information to achieve the operations detailed herein. In one example, the processors, such as e.g. the processor 1202 shown in FIG. 12, could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., an FPGA, a DSP, an erasable programmable read-only memory (EPROM), an electrically erasable programmable read-only memory (EEPROM)) or an ASIC that includes digital logic, software, code, electronic instructions, or any suitable combination thereof.

The memory elements 1204 may include one or more physical memory devices such as, for example, local memory 1208 and one or more bulk storage devices 1210. The local memory may refer to RAM or other non-persistent memory device(s) generally used during actual execution of the program code. A bulk storage device may be implemented as a hard drive or other persistent data storage device. The processing system 1200 may also include one or more cache memories (not shown) that provide temporary storage of at least some program code in order to reduce the number of times program code must be retrieved from the bulk storage device 1210 during execution.

As shown in FIG. 12, the memory elements 1204 may store an application 1218. In various embodiments, the application 1218 may be stored in the local memory 1208, the one or more bulk storage devices 1210, or apart from the local memory and the bulk storage devices. It should be appreciated that the data processing system 1200 may further execute an operating system (not shown in FIG. 12) that can facilitate execution of the application 1218. The application 1218, being implemented in the form of executable program code, can be executed by the data processing system 1200, e.g., by the processor 1202. Responsive to executing the application, the data processing system 1200 may be configured to perform one or more operations or method steps described herein.

Input/output (I/O) devices depicted as an input device 1212 and an output device 1214, optionally, can be coupled to the data processing system. Examples of input devices may include, but are not limited to, a keyboard, a pointing device such as a mouse, or the like. Examples of output devices may include, but are not limited to, a monitor or a display, speakers, or the like. In some embodiments, the output device 1214 may be any type of screen display, such as plasma display, liquid crystal display (LCD), organic light emitting diode (OLED) display, electroluminescent (EL) display, or any other indicator, such as a dial, barometer, or LEDs. In some implementations, the system may include a driver (not shown) for the output device 1214. Input and/or output devices 1212, 1214 may be coupled to the data processing system either directly or through intervening I/O controllers.

In an embodiment, the input and the output devices may be implemented as a combined input/output device (illustrated in FIG. 12 with a dashed line surrounding the input device 1212 and the output device 1214). An example of such a combined device is a touch sensitive display, also sometimes referred to as a "touch screen display" or simply "touch screen". In such an embodiment, input to the device may be provided by a movement of a physical object, such as e.g. a stylus or a finger of a user, on or near the touch screen display.

A network adapter 1216 may also, optionally, be coupled to the data processing system to enable it to become coupled to other systems, computer systems, remote network devices, and/or remote storage devices through intervening private or public networks. The network adapter may comprise a data receiver for receiving data that is transmitted by said systems, devices and/or networks to the data processing system 1200, and a data transmitter for transmitting data from the data processing system 1200 to said systems, devices and/or networks. Modems, cable modems, and Ethernet cards are examples of different types of network adapter that may be used with the data processing system 1200.

SELECT EXAMPLES

The following paragraphs provide various examples of the embodiments disclosed herein.

Example 1 provides an antenna apparatus that includes an antenna array, a plurality of calibration antenna elements, and a calibration circuitry. The antenna array includes a plurality of active antenna elements arranged in N rows and M columns, where N and M are integers (e.g., integers greater than four), each antenna element being a dual-polarization antenna element. The calibration antenna elements are provided along a side of the antenna array so that each calibration antenna element is substantially equidistant to each of a pair of active antenna elements which are closest to each calibration antenna element. The calibration circuitry is configured to perform calibration of the active antenna elements based on signals propagating between the active antenna elements and a subset of the calibration antenna elements.

Example 2 provides the antenna apparatus according to example 1, where the side of the array along which the plurality of calibration antenna elements are provided is a first side, where the first side is either a top row or a bottom row of the antenna array. In such an example, the antenna apparatus further includes a plurality of additional antenna elements provided along a second side of the antenna array so that each additional antenna element is substantially equidistant to each of a pair of active antenna elements which are closest to the second side and closest to the each additional antenna element. The second side is the bottom row of the antenna array when the first side is the top row of the antenna array, or vice versa. The calibration circuitry is further configured to perform calibration of the active antenna elements based on signals propagating between the active antenna elements and at least a subset of the additional antenna elements.

Example 3 provides the antenna apparatus according to example 2, further including a first plurality of dummy antenna elements, provided in a column parallel to and closest to a first column of the antenna array so that each dummy antenna element of the first plurality of dummy antenna elements is substantially aligned with one of the active antenna elements of the first column, and a second plurality of dummy antenna elements, provided in a column parallel to and closest to a last column of the antenna array so that each dummy antenna element of the second plurality of dummy antenna elements is substantially aligned with one of the active antenna elements of the last column.

Example 4 provides the antenna apparatus according to example 3, where the first and the second pluralities of dummy antenna elements are configured to provide impedance matching for the plurality of calibration antenna elements provided along the first side of the antenna array and/or the plurality of additional antenna elements provided along the second side of the antenna array. In other words, the plurality of calibration antenna elements provided along the first side of the antenna array and/or the plurality of additional antenna elements provided along the second side of the antenna array are impedance-matched.

Example 5 provides the antenna apparatus according to any one of the preceding examples, where the antenna apparatus further includes an up and down converter (UDC) H1, an UDC V1, and UDC H2, and an UDC V2, the active antenna elements in columns 1 through X are configured to be coupled to the UDC H1 and the UDC V1 and are configured to not be coupled to the UDC H2 and the UDC V2, where X is an integer greater than zero and smaller than M, and the active antenna elements in columns X+1 through M are configured to be coupled to the UDC H2 and the UDC V2 and are configured to not be coupled to the UDC H1 and the UDC V1.

Example 6 provides an antenna apparatus that includes an antenna array, including a plurality of antenna cells (e.g., antenna cells 210, shown in FIG. 2) arranged in K rows and L columns, where K is an integer equal to or greater than 3, L is an integer equal to or greater than 4, and where each antenna cell includes a plurality of antenna elements, e.g., 8 antenna elements arranged in 2 rows and 4 columns. Each antenna element is a dual-polarization antenna element. Antenna cells in columns 1 through Y are antenna cells of a first sub-array, where Y is an integer equal to or greater than 2 and less than L. Antenna cells in columns Y+1 through L are antenna cells of a second sub-array. The antenna apparatus further includes a calibration circuitry, configured to, in a step 1, for each column of antenna cells of the first sub-array, calibrate antenna elements of the column of antenna cells of the first sub-array with respect to one another, in a step 2, calibrate antenna elements of different columns (of Y columns) of the antenna cells of the first sub-array with respect to one another, in a step 3, for each column of antenna cells of the second sub-array, calibrate antenna elements of the column of antenna cells of the second sub-array with respect to one another, in a step 4, calibrate antenna elements of different columns (of L-Y columns) of the antenna cells of the second sub-array with respect to one another, and, in a step 5, calibrate antenna elements of the first sub-array and antenna elements of the second sub-array with respect to one another.

Example 7 provides the antenna apparatus according to example 6, where the calibration circuitry is configured to perform the step 1 before performing the step 2, perform the step 2 before performing the step 3, perform the step 3 before performing the step 4, and perform the step 4 before performing the step 5.

Example 8 provides the antenna apparatus according to example 6, where the calibration circuitry is configured to perform the step 2 before performing the step 1, perform the step 1 before performing the step 4, perform the step 4 before performing the step 3, and perform the step 3 before performing the step 5.

Example 9 provides the antenna apparatus according to example 6, where the calibration circuitry is configured to perform the step 5 before performing the step 1, perform the step 1 before performing the step 2, perform the step 2 before performing the step 3, and perform the step 3 before performing the step 4.

Example 10 provides the antenna apparatus according to example 6, where the calibration circuitry is configured to perform the step 5 before performing the step 3, perform the step 3 before performing the step 4, perform the step 4 before performing the step 1, and perform the step 1 before performing the step 2.

Example 11 provides the antenna apparatus according to any one of examples 6-10, where the step 1 includes, for at least one column of antenna cells of the first sub-array, calibrating antenna elements of a first odd row and a second odd row of the at least one column of antenna cells of the first sub-array with respect to one another based on observations of signals between 1) antenna elements of an even row of antenna cells of the second sub-array that is between the first odd row and the second odd row, and 2) the antenna elements of the first odd row and the second odd row of the at least one column of antenna cells of the first sub-array, and calibrating antenna elements of a first even row and a second even row of the at least one column of antenna cells of the first sub-array with respect to one another based on observations of signals between 1) antenna elements of an odd row of antenna cells of the second sub-array that is between the first even row and the second even row, and 2) the antenna elements of the first even row and the second even row of the at least one column of antenna cells of the first sub-array.

Example 12 provides the antenna apparatus according to example 11, where the step 1 further includes, for the at least one column of antenna cells of the first sub-array, calibrating antenna elements of the first odd row and the second even row of the at least one column of antenna cells of the first sub-array with respect to one another based on observations of signals between 1) antenna elements of two rows of antenna cells of the second sub-array that is between the first odd row and the second even row, and 2) the antenna elements of the first odd row and the second even row of the at least one column of antenna cells of the first sub-array.

Example 13 provides the antenna apparatus according to any one of examples 6-12, where the antenna apparatus further includes a plurality of calibration antenna elements, provided along a side of the antenna array so that each calibration antenna element is substantially equidistant to each antenna cell of a pair of adjacent antenna cells, within a given row of antenna cells, which are closest to the each calibration antenna element, and where the step 2 includes calibrating antenna elements of a first pair of adjacent antenna cells (i.e., antenna cells of two adjacent columns) of the first sub-array with respect to one another based on observations of signals between 1) a calibration antenna element, of the plurality of calibration antenna elements, that is substantially equidistant to each antenna cell of the first pair of adjacent antenna cells of the first sub-array, and 2) the antenna elements of the first pair of adjacent antenna cells of the first sub-array.

Example 14 provides the antenna apparatus according to example 13, where the step 4 includes calibrating antenna elements of a first pair of adjacent antenna cells (i.e., antenna cells of two adjacent columns) of the second sub-array with respect to one another based on observations of signals between 1) a calibration antenna element, of the plurality of calibration antenna elements, that is substantially equidistant to each antenna cell of the first pair of adjacent antenna cells of the second sub-array, and 2) the antenna elements of the first pair of adjacent antenna cells of the second sub-array.

Example 15 provides the antenna apparatus according to examples 13 or 14, where the step 5 includes calibrating antenna elements of a first antenna cell of the first sub-array and a first antenna cell of the second sub-array with respect to one another based on observations of signals between 1) a calibration antenna element, of the plurality of calibration antenna elements, that is substantially equidistant to the first antenna cell of the first sub-array and the first antenna cell of the second sub-array, and 2) the antenna elements of the first antenna cell of the first sub-array and the first antenna cell of the second sub-array.

Example 16 provides the antenna apparatus according to example 15, where the first antenna cell of the first sub-array and the first antenna cell of the second sub-array are adjacent antenna cells of the antenna array.

Example 17 provides the antenna apparatus according to any one of examples 6-16, where the step 3 includes, for at least one column of antenna cells of the second sub-array, calibrating antenna elements of a first odd row and a second odd row of the at least one column of antenna cells of the second sub-array with respect to one another based on observations of signals between 1) antenna elements of an even row of antenna cells of the first sub-array that is between the first odd row and the second odd row, and 2) the antenna elements of the first odd row and the second odd row of the at least one column of antenna cells of the second sub-array, and calibrating antenna elements of a first even row and a second even row of the at least one column of antenna cells of the second sub-array with respect to one another based on observations of signals between 1) antenna elements of an odd row of antenna cells of the first sub-array that is between the first even row and the second even row, and 2) the antenna elements of the first even row and the second even row of the at least one column of antenna cells of the second sub-array.

Example 18 provides the antenna apparatus according to example 17, where the step 3 further includes, for the at least one column of antenna cells of the second sub-array, calibrating antenna elements of the first odd row and the second even row of the at least one column of antenna cells of the second sub-array with respect to one another based on observations of signals between 1) antenna elements of two rows of antenna cells of the first sub-array that is between the first odd row and the second even row, and 2) the antenna elements of the first odd row and the second even row of the at least one column of antenna cells of the second sub-array.

Example 19 provides the antenna apparatus according to any one of examples 6-18, where each antenna cell is coupled to a respective (i.e., different/corresponding) beamformer.

Example 20 provides the antenna apparatus according to example 19, where, for each antenna cell of the first sub-array, the beamformer of the antenna cell of the first sub-array is coupled to each of an up and down converter (UDC) H1 and an UDC V1, and, for each antenna cell of the second sub-array, the beamformer of the antenna cell of the second sub-array is coupled to each of an UDC H2 and an UDC V2.

Example 21 provides a method of operating an antenna apparatus according to any one of the preceding examples.

Example 22 provides a method of performing calibration of the antenna array of the antenna apparatus according to any one of the preceding examples.

Example 23 provides a non-transitory computer-readable storage medium including instructions for execution which, when executed by a processor, are operable to perform operations of the method according to examples 21 or 22.

In further examples, the non-transitory computer-readable storage medium according to example 23 may further include instructions operable to perform operations performed by any parts of the systems and methods for performing calibration of antenna arrays with dual-polarization antenna elements according to any one of the preceding examples.

VARIATIONS AND IMPLEMENTATIONS

While embodiments of the present disclosure were described above with references to exemplary implementations as shown in FIGS. 1-12, a person skilled in the art will realize that the various teachings described above are applicable to a large variety of other implementations. For example, the same principles may be applied to radar systems, automotive radar, frequency generation circuits, etc.

In certain contexts, the features discussed herein can be applicable to automotive systems, medical systems, scientific instrumentation, wireless and wired communications, radio, radar, and digital-processing-based systems.

In the discussions of the embodiments above, components of a system, such as phase shifters, frequency mixers, amplifiers, and/or other components can readily be replaced, substituted, or otherwise modified in order to accommodate particular circuitry needs. Moreover, it should be noted that the use of complementary electronic devices, hardware, software, etc., offer an equally viable option for implementing the teachings of the present disclosure related to systems and methods for performing calibration of antenna arrays with dual-polarization antenna elements as described herein.

Parts of various systems for implementing calibration of antenna arrays with dual-polarization antenna elements as proposed herein can include electronic circuitry to perform the functions described herein. In some cases, one or more parts of the system can be provided by a processor specially configured for carrying out the functions described herein. For instance, the processor may include one or more application specific components, or may include programmable logic gates which are configured to carry out the functions describe herein. The circuitry can operate in analog domain, digital domain, or in a mixed-signal domain. In some instances, the processor may be configured to carrying out the functions described herein by executing one or more instructions stored on a non-transitory computer-readable storage medium.

In one example embodiment, any number of electrical circuits of the present figures may be implemented on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable processors (inclusive of DSPs, microprocessors, supporting chipsets, etc.), computer-readable non-transitory memory elements, etc. can be suitably coupled to the board based on particular configuration needs, processing demands, computer designs, etc. Other components such as external storage, additional sensors, controllers for audio/video display, and peripheral devices may be attached to the board as plug-in cards, via cables, or integrated into the board itself. In various embodiments, the functionalities described herein may be implemented in emulation form as software or firmware running within one or more configurable (e.g., programmable) elements arranged in a structure that supports these functions. The software or firmware providing the emulation may be provided on non-transitory computer-readable storage medium comprising instructions to allow a processor to carry out those functionalities.

In another example embodiment, the electrical circuits of the present figures may be implemented as stand-alone modules (e.g., a device with associated components and circuitry configured to perform a specific application or function) or implemented as plug-in modules into application specific hardware of electronic devices. Note that particular embodiments of the present disclosure may be readily included in a system on chip (SOC) package, either in part, or in whole. An SOC represents an IC that integrates components of a computer or other electronic system into a single chip. It may contain digital, analog, mixed-signal, and often RF functions: all of which may be provided on a single chip substrate. Other embodiments may include a multi-chip-module (MCM), with a plurality of separate ICs located within a single electronic package and configured to interact closely with each other through the electronic package.

It is also imperative to note that all of the specifications, dimensions, and relationships outlined herein (e.g., the number of components shown in the systems of FIGS. 1-3, 5-9, and 12 etc.) have only been offered for purposes of example and teaching only. Such information may be varied considerably without departing from the spirit of the present disclosure, or the scope of the appended claims. It should be appreciated that the system can be consolidated in any suitable manner. Along similar design alternatives, any of the illustrated circuits, components, modules, and elements of the present figures may be combined in various possible configurations, all of which are clearly within the broad scope of this specification. In the foregoing description, example embodiments have been described with reference to particular processor and/or component arrangements. Various modifications and changes may be made to such embodiments without departing from the scope of the appended claims. The description and drawings are, accordingly, to be regarded in an illustrative rather than in a restrictive sense.

It is also important to note that the functions related to performing calibration of antenna arrays with dual-polarization antenna elements as proposed herein illustrate only some of the possible functions that may be executed by, or within, RF systems. Some of these operations may be deleted or removed where appropriate, or these operations may be modified or changed considerably without departing from the scope of the present disclosure. Substantial flexibility is provided by embodiments described herein in that any suitable arrangements, chronologies, configurations, and timing mechanisms may be provided without departing from the teachings of the present disclosure.

The invention claimed is:

1. An antenna apparatus, comprising:
   an antenna array, comprising a plurality of antenna cells arranged in K rows and L columns, wherein:
   each antenna cell includes a plurality of antenna elements,
   each antenna element is a dual-polarization antenna element,
   antenna cells in columns 1 through Y are antenna cells of a first sub-array,
   Y is an integer equal to or greater than 2 and less than L, and
   antenna cells in columns Y+1 through L are antenna cells of a second sub-array; and
   a calibration circuitry, to:
   in a step 1, for each column of antenna cells of the first sub-array, calibrate antenna elements of the column of the antenna cells of the first sub-array with respect to one another,
   in a step 2, calibrate antenna elements of different columns of the antenna cells of the first sub-array with respect to one another using a plurality of calibration antenna elements other than the antenna elements of the antenna array, each calibration antenna element of the plurality of calibration antenna elements being equidistant to a respective pair of antenna elements of adjacent columns of the antenna cells of the first sub-array and being further away from other antenna elements of the adjacent columns than from the respective pair of antenna elements,
   in a step 3, for each column of antenna cells of the second sub-array, calibrate antenna elements of the column of the antenna cells of the second sub-array with respect to one another,
   in a step 4, calibrate antenna elements of different columns of the antenna cells of the second sub-array with respect to one another, and
   in a step 5, calibrate antenna elements of the first sub-array and antenna elements of the second sub-array with respect to one another,
   wherein the step 1 includes, for at least one column of the antenna cells of the first sub-array;
   calibrating antenna elements of a first odd row and a second odd row of the at least one column of the antenna cells of the first sub-array with respect to one another based on antenna elements of an even row of the antenna cells of the second sub-array that is between the first odd row and the second odd row of the at least one column of the antenna cells of the first sub-array, calibrating antenna elements of a first even row and a second even row of the at least one column of the antenna cells of the first sub-array with respect to one another based on antenna elements of an odd row of the antenna cells of the second sub-array that is between the first even row and the second even row of the at least one column of the antenna cells of the first sub-array, and calibrating antenna elements of the first odd row and the second even row of the at least one column of the antenna cells of the first sub-array with respect to one another based on antenna elements of two rows of the antenna cells of the second sub-array that are between the first odd row and the second even row of the at least one column of the antenna cells of the first sub-array.

2. The antenna apparatus according to claim 1, wherein the calibration circuitry is to perform the step 1 before performing the step 2, perform the step 2 before performing the step 3, perform the step 3 before performing the step 4, and perform the step 4 before performing the step 5.

3. The antenna apparatus according to claim 1, wherein the calibration circuitry is to perform the step 2 before performing the step 1, perform the step 1 before performing the step 4, perform the step 4 before performing the step 3, and perform the step 3 before performing the step 5.

4. The antenna apparatus according to claim 1, wherein the calibration circuitry is to perform the step 5 before performing the step 1, perform the step 1 before performing the step 2, perform the step 2 before performing the step 3, and perform the step 3 before performing the step 4.

5. The antenna apparatus according to claim 1, wherein the calibration circuitry is to perform the step 5 before performing the step 3, perform the step 3 before performing the step 4, perform the step 4 before performing the step 1, and perform the step 1 before performing the step 2.

6. The antenna apparatus according to claim 1, wherein the plurality of calibration antenna elements is along a side of the antenna array so that each calibration antenna element is substantially equidistant to a pair of adjacent antenna cells within a single row of the antenna cells that are closest to the each calibration antenna element, and wherein the step 2 includes:

calibrating antenna elements of a first pair of adjacent antenna cells of the first sub-array with respect to one another based on a calibration antenna element of the plurality of calibration antenna elements; that is substantially equidistant to the first pair of adjacent antenna cells of the first sub-array.

7. The antenna apparatus according to claim 6, wherein the step 4 includes:

calibrating antenna elements of a first pair of adjacent antenna cells of the second sub-array with respect to one another based on a calibration antenna element of the plurality of calibration antenna elements: that is substantially equidistant to the first pair of adjacent antenna cells of the second sub-array.

8. The antenna apparatus according to claim 6, wherein the step 5 includes:

calibrating antenna elements of a first antenna cell of the first sub-array and a first antenna cell of the second sub-array with respect to one another based on a calibration antenna element; of the plurality of calibration antenna elements: that is substantially equidistant to the first antenna cell of the first sub-array and the first antenna cell of the second sub-array.

9. The antenna apparatus according to claim 1, wherein:

each antenna cell is coupled to a respective beamformer, for each antenna cell of the first sub-array, the beamformer of the antenna cell of the first sub-array is coupled to each of an up and down converter (UDC) H1 and an UDC V1, and for each antenna cell of the second sub-array, the beamformer of the antenna cell of the second sub-array is coupled to each of an UDC H2 and an UDC V2.

10. The antenna apparatus according to claim 1, wherein the plurality of calibration antenna element is at a periphery of the antenna array.

11. An antenna apparatus, comprising:

an antenna array, comprising a plurality of antenna cells arranged in K rows and L columns, where:

each antenna cell includes a plurality of antenna elements, each antenna element is a dual-polarization antenna element, antenna cells in columns 1 through Y are antenna cells of a first sub-array, Y is an integer equal to or greater than 2 and less than L, and antenna cells in columns Y+1 through L are antenna cells of a second sub-array; and a calibration circuitry, to:

calibrate antenna elements of a first odd row and a second odd row of a column of antenna cells of the first sub-array with respect to one another based on antenna elements of an even row of the antenna cells of the second sub-array that is between the first odd row and the second odd row of the column of the antenna cells of the first sub-array, calibrate antenna elements of a first even row and a second even row of the column of the antenna cells of the first sub-array with respect to one another based on antenna elements of an odd row of the antenna cells of the second sub-array that is between the first even row and the second even row of the column of the antenna cells of the first sub-array, and calibrate antenna elements of the first odd row and the second even row of the column of the antenna cells of the first sub-array with respect to one another based on antenna elements of two rows of the antenna cells of the second sub-array that is between the first odd row and the second even row of the column of the antenna cells of the first sub-array.

12. The antenna apparatus according to claim 11, wherein the calibration circuitry is further to:

calibrate antenna elements of different columns of the antenna cells of the first sub-array with respect to one another, for each column of the antenna cells of the second sub-array, calibrate antenna elements of the column of the antenna cells of the second sub-array with respect to one another, calibrate antenna elements of different columns of the antenna cells of the second sub-array with respect to one another, and calibrate antenna elements of the first sub-array and antenna elements of the second sub-array with respect to one another.

13. The antenna apparatus according to claim 11, wherein each antenna cell is coupled to a respective beamformer.

14. The antenna apparatus according to claim 13, wherein:
- for each antenna cell of the first sub-array, the beamformer of the antenna cell of the first sub-array is coupled to each of an up and down converter (UDC) H1 and an UDC V1, and
- for each antenna cell of the second sub-array, the beamformer of the antenna cell of the second sub-array is coupled to each of an UDC H2 and an UDC V2.

15. The antenna apparatus according to claim 11, wherein a plurality of calibration antenna elements is at a periphery of the antenna array.

16. An antenna apparatus, comprising:
- an antenna array, comprising a plurality of antenna cells arranged in K rows and L columns, wherein:
  - each antenna cell includes a plurality of antenna elements,
  - each antenna element is a dual-polarization antenna element,
  - antenna cells in columns 1 through Y are antenna cells of a first sub-array,
  - Y is an integer equal to or greater than 2 and less than L, and
  - antenna cells in columns Y+1 through L are antenna cells of a second sub-array; and
- a calibration circuitry, to:
  - in a step 1, for each column of antenna cells of the first sub-array, calibrate antenna elements of the column of the antenna cells of the first sub-array with respect to one another,
  - in a step 2, calibrate antenna elements of different columns of the antenna cells of the first sub-array with respect to one another using a plurality of calibration antenna elements other than the antenna elements of the antenna array, each calibration antenna element of the plurality of calibration antenna elements being equidistant to a respective pair of antenna elements of adjacent columns of the antenna cells of the first sub-array and being further away from other antenna elements of the adjacent columns than from the respective pair of antenna elements,
  - in a step 3, for each column of antenna cells of the second sub-array, calibrate antenna elements of the column of the antenna cells of the second sub-array with respect to one another,
  - in a step 4, calibrate antenna elements of different columns of the antenna cells of the second sub-array with respect to one another, and
  - in a step 5, calibrate antenna elements of the first sub-array and antenna elements of the second sub-array with respect to one another, wherein the step 3 includes, for at least one column of the antenna cells of the second sub-array:
- calibrating antenna elements of a first odd row and a second odd row of the at least one column of the antenna cells of the second sub-array with respect to one another based on antenna elements of an even row of the antenna cells of the first sub-array that is between the first odd row and the second odd row of the at least one column of the antenna cells of the second sub-array,
- calibrating antenna elements of a first even row and a second even row of the at least one column of the antenna cells of the second sub-array with respect to one another based on antenna elements of an odd row of the antenna cells of the first sub-array that is between the first even row and the second even row of the at least one column of the antenna cells of the second sub-array, and
- calibrating antenna elements of the first odd row and the second even row of the at least one column of the antenna cells of the second sub-array with respect to one another based on antenna elements of two rows of the antenna cells of the first sub-array that is between the first odd row and the second even row of the at least one column of the antenna cells of the second sub-array.

17. The antenna apparatus according to claim 16, wherein the calibration circuitry is to perform the step 1 before performing the step 2, perform the step 2 before performing the step 3, perform the step 3 before performing the step 4, and perform the step 4 before performing the step 5.

18. The antenna apparatus according to claim 16, wherein the calibration circuitry is to perform the step 2 before performing the step 1, perform the step 1 before performing the step 4, perform the step 4 before performing the step 3, and perform the step 3 before performing the step 5.

19. The antenna apparatus according to claim 16, wherein the calibration circuitry is to perform the step 5 before performing the step 1, perform the step 1 before performing the step 2, perform the step 2 before performing the step 3, and perform the step 3 before performing the step 4.

20. The antenna apparatus according to claim 16, wherein the calibration circuitry is to perform the step 5 before performing the step 3, perform the step 3 before performing the step 4, perform the step 4 before performing the step 1, and perform the step 1 before performing the step 2.

* * * * *